(12) United States Patent
Youn

(10) Patent No.: US 12,250,593 B2
(45) Date of Patent: Mar. 11, 2025

(54) METHOD FOR MEASURING PERFORMANCE FOR QOS

(71) Applicant: LG Electronics Inc., Seoul (KR)

(72) Inventor: Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 17/709,929

(22) Filed: Mar. 31, 2022

(65) Prior Publication Data

US 2022/0322152 A1    Oct. 6, 2022

(30) Foreign Application Priority Data

Apr. 1, 2021   (KR) .................. 10-2021-0042742
Apr. 6, 2021   (KR) .................. 10-2021-0044394

(51) Int. Cl.
   *H04W 28/24*   (2009.01)
   *H04W 24/10*   (2009.01)
   *H04W 28/02*   (2009.01)

(52) U.S. Cl.
   CPC .......... *H04W 28/24* (2013.01); *H04W 24/10* (2013.01); *H04W 28/0268* (2013.01); *H04W 28/0273* (2013.01)

(58) Field of Classification Search
   CPC . H04W 28/24; H04W 24/10; H04W 28/0268; H04W 28/0273
   See application file for complete search history.

(56) References Cited

U.S. PATENT DOCUMENTS

| | | | |
|---|---|---|---|
| 10,834,626 B2 | 11/2020 | Youn et al. | |
| 2019/0028920 A1* | 1/2019 | Pan | .......... H04L 47/24 |
| 2019/0254118 A1* | 8/2019 | Dao | ............... H04L 67/141 |
| 2020/0128432 A1 | 4/2020 | Youn et al. | |
| 2020/0383005 A1 | 12/2020 | Wu et al. | |
| 2021/0022024 A1 | 1/2021 | Yao et al. | |
| 2022/0264370 A1* | 8/2022 | Qiao | ............... H04W 28/0967 |

FOREIGN PATENT DOCUMENTS

| | | |
|---|---|---|
| CN | 109548088 A | 3/2019 |
| WO | WO 2020146376 | 7/2020 |
| WO | WO 2020/218807 A1 | 10/2020 |

OTHER PUBLICATIONS

3GPP TS 23.503 V17.0.0 (Mar. 2021), "3rd Generation Partnership Project; Technical Specification Group Services and System Aspects; Policy and charging control framework for the 5G System (5GS); Stage 2 (Release 17), " Mar. 2021, 128 pages.
International Search Report in International Application No. PCT/KR2022/004587, dated Jul. 6, 2022, 3 pages.
Extended European Search Report in European APpln. No. 22781638.6, mailed on Jan. 8, 2025, 9 pages.

* cited by examiner

*Primary Examiner* — Duc C Ho
(74) *Attorney, Agent, or Firm* — Fish & Richardson P.C.

(57) ABSTRACT

A disclosure of this specification provides a method for performance measurement of SDF (service data flow), performed by SMF (Session Management Function), the device comprising: receiving a QoS (Quality of Service) rule from a SMF (Session Management Function); performing measurement of performance of a target QoS flow for the SDF, with a UPF (User Plane Function), wherein based on a reflective QoS being not used for the SDF, the QoS rule includes downlink QoS information on the target QoS flow, wherein the target QoS flow is a QoS flow used by the UE to receive a downlink packet for the SDF.

9 Claims, 15 Drawing Sheets

METHOD FOR MEASURING PERFORMANCE FOR QOS

CROSS-REFERENCE TO RELATED APPLICATIONS

Pursuant to 35 U.S.C. § 119 (a), this application claims the benefit of Korean Patent Applications No. 10-2021-0042742, filed on Apr. 1, 2021 and Korean Patent Applications No. 10-2021-0044394, filed on Apr. 6, 2021, the contents of which are all hereby incorporated by reference herein in their entirety.

BACKGROUND OF THE DISCLOSURE

Field of the Disclosure

The present disclosure relates to mobile communication.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

When measuring the performance of multiple QoS flows in the MA PDU session, there is a problem in that the UE does not recognize the performance measurement for which QoS flow.

SUMMARY OF THE DISCLOSURE

In accordance with an embodiment of the present disclosure, a disclosure of this specification provides a method for performance measurement of SDF (service data flow), performed by SMF (Session Management Function), comprising: determining performance measurement of a target QoS (Quality of Service) flow, wherein downlink packet for the SDF is transmitted on the target QoS flow to a UE (user equipment); including downlink QoS information on the target QoS flow in a QoS rule, based on a reflective QoS being not used for the SDF; and transmitting the QoS rule to the UE.

The present disclosure can have various advantageous effects.

For example, by performing disclosure of this specification, UE is able to know which QoS flow the performance is being measured when measuring the performance of the QoS flow.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
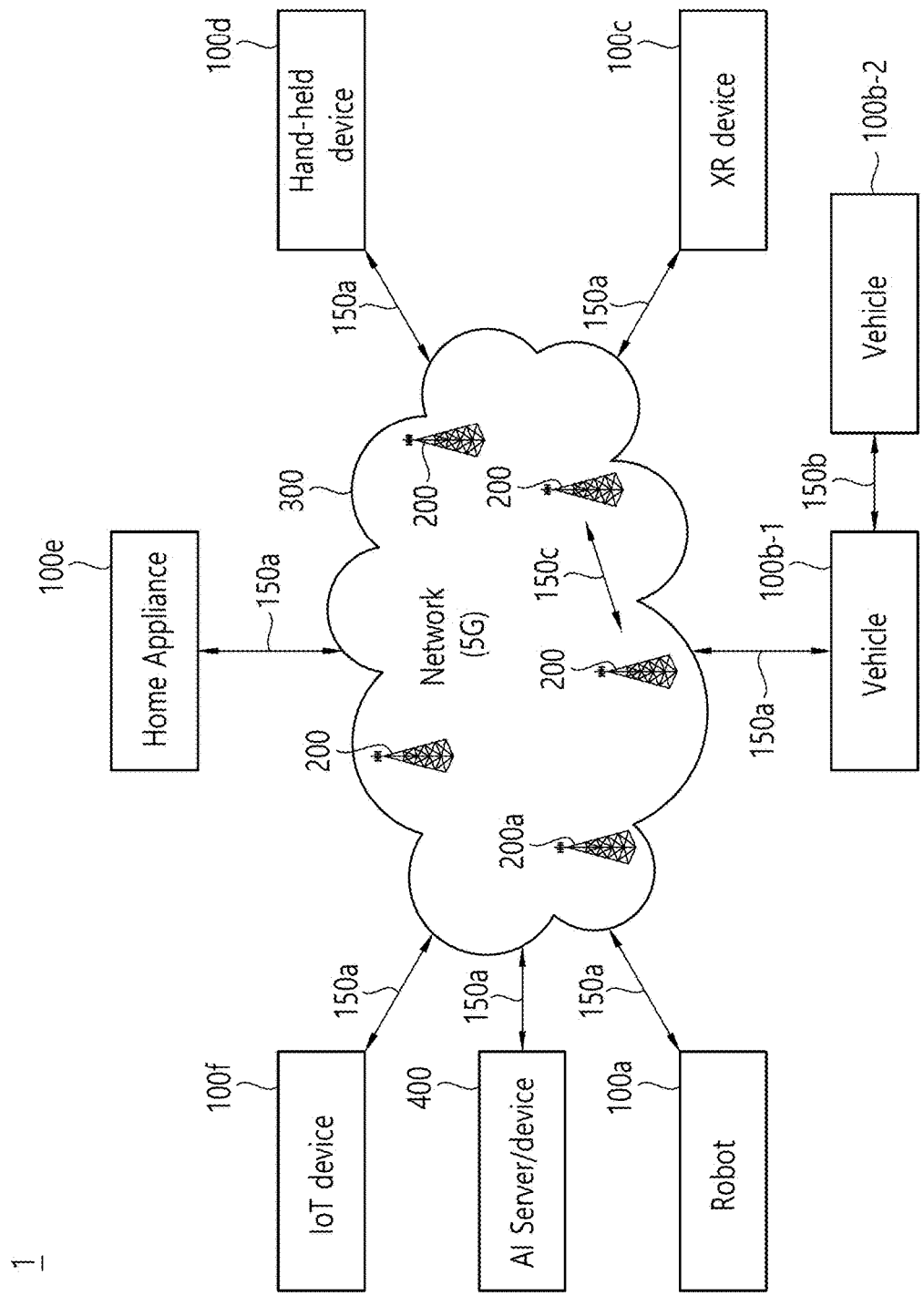
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). AUE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
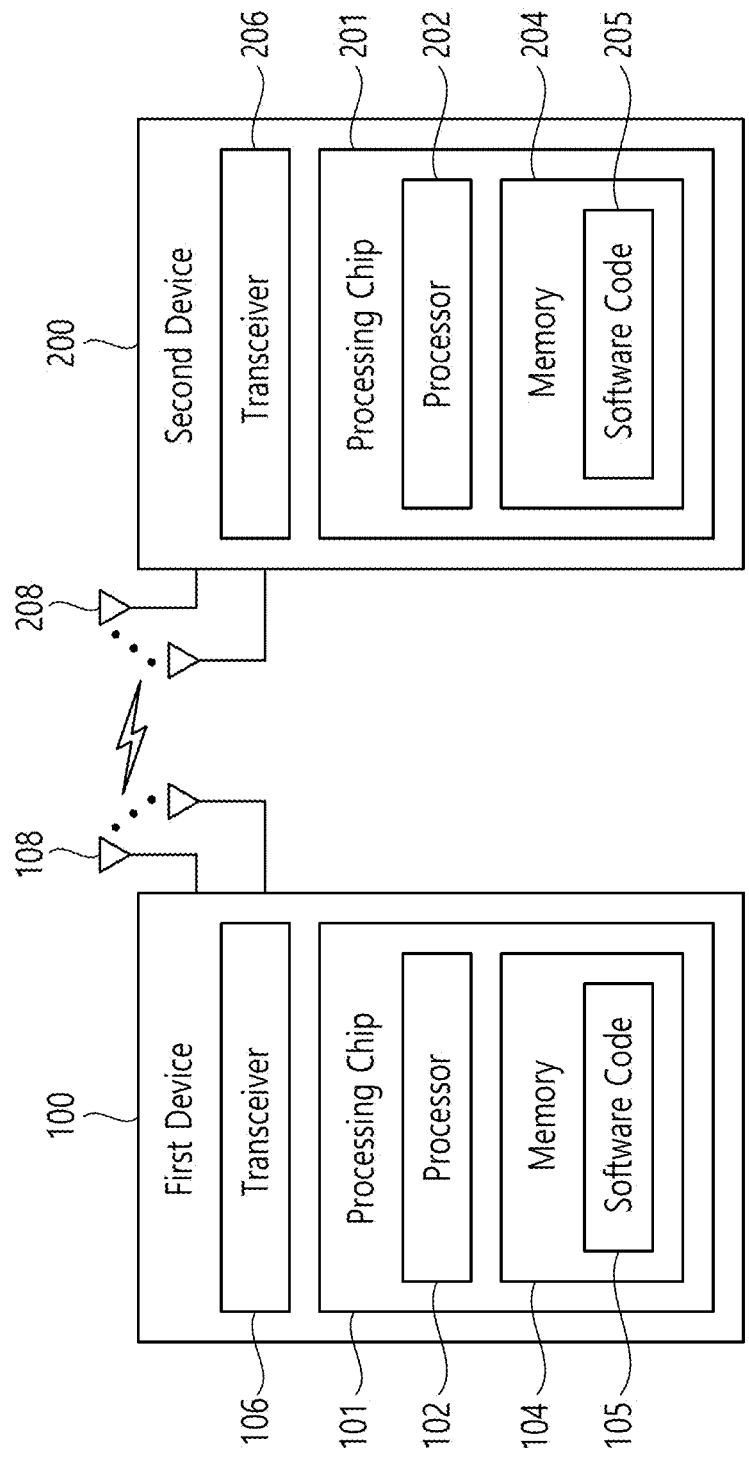
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
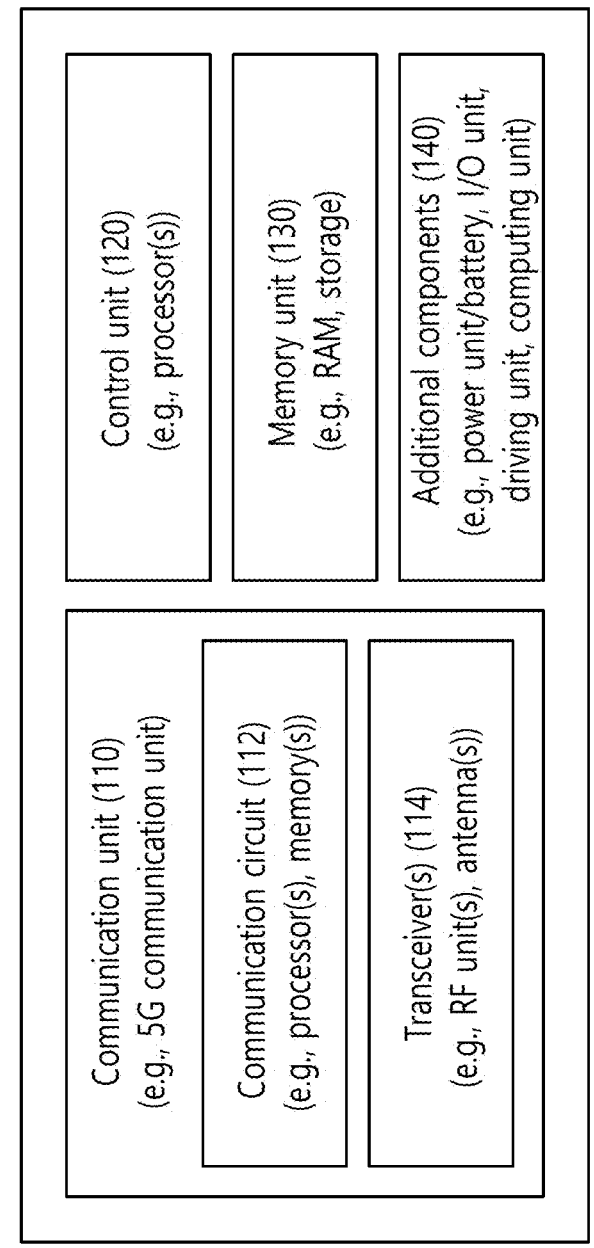
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
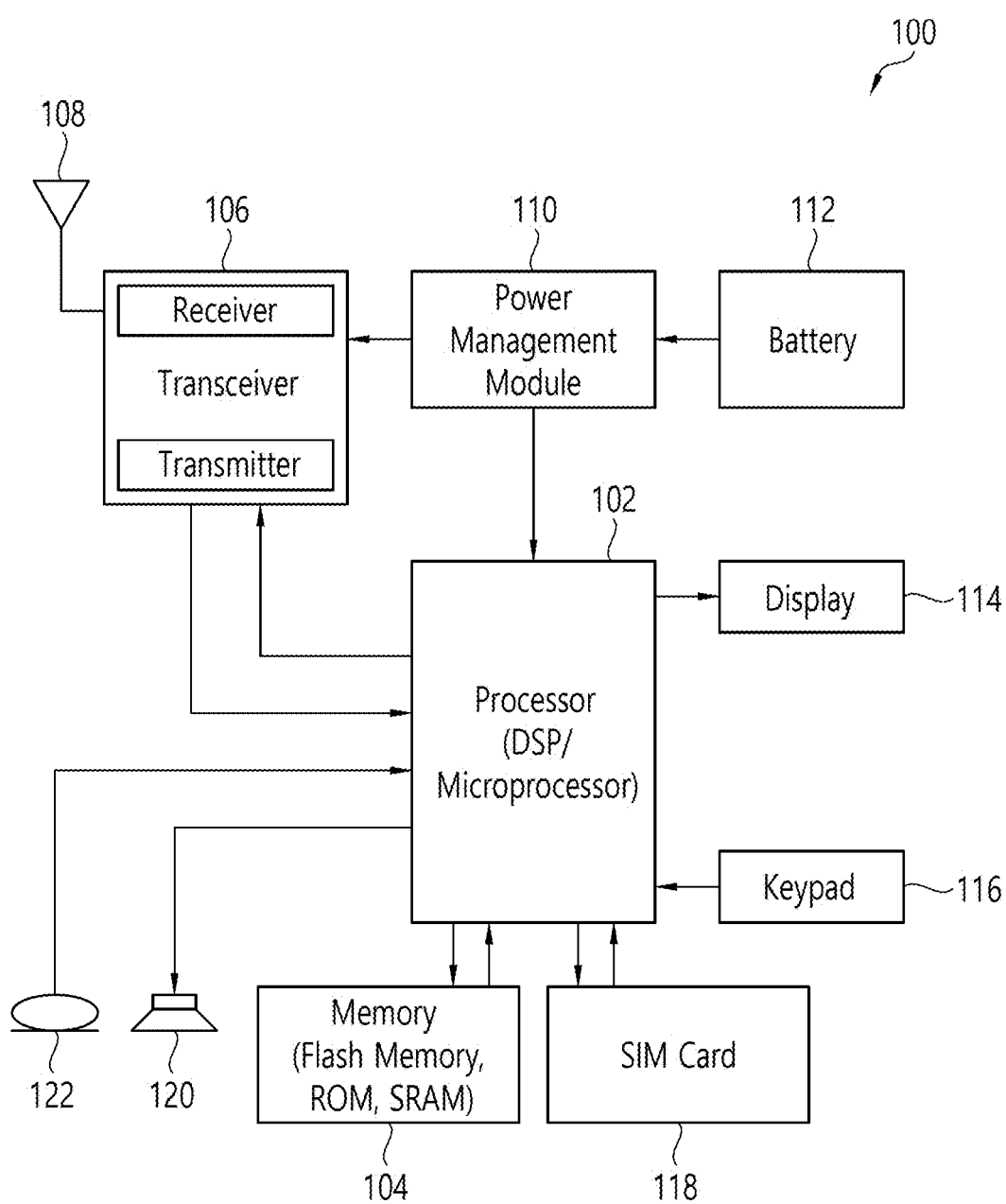
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
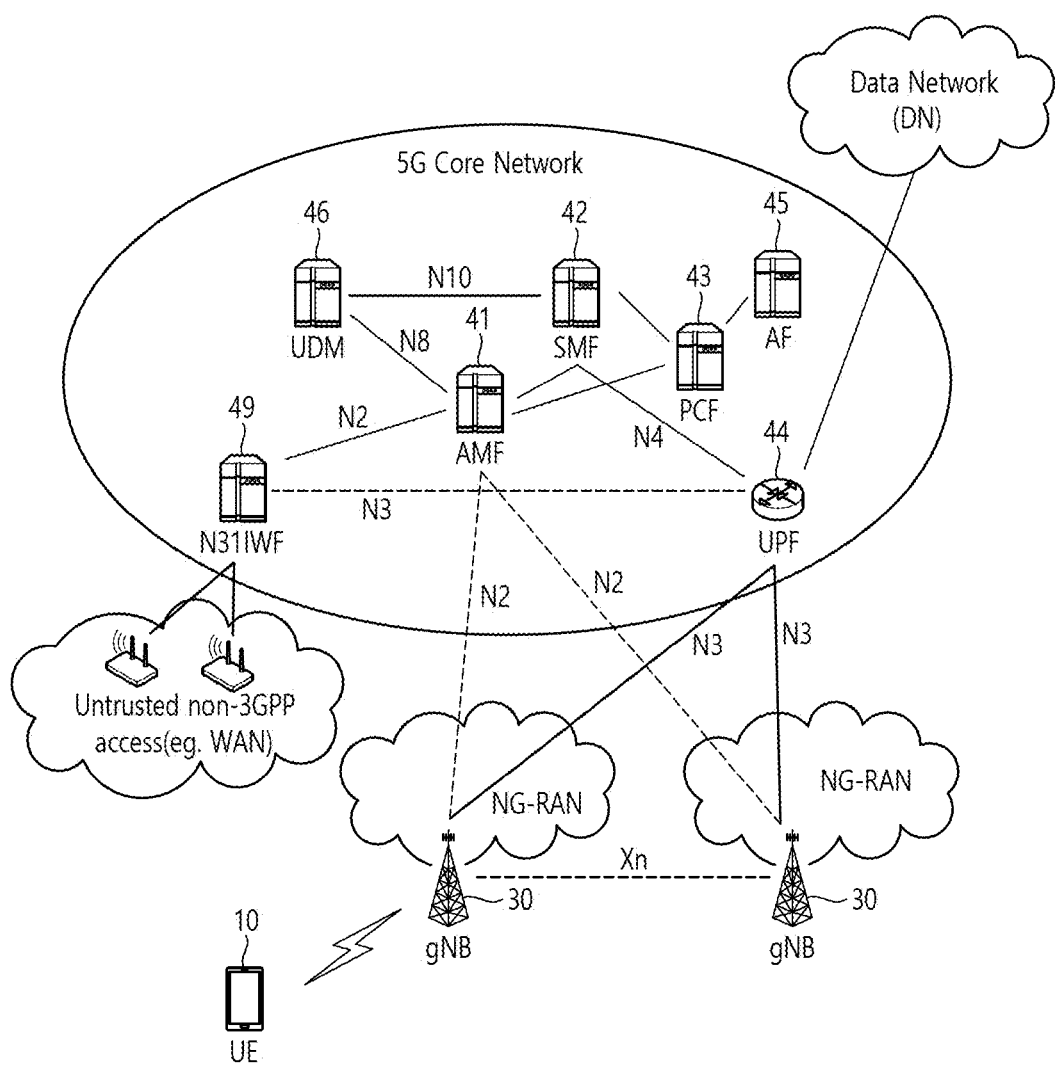
FIG. 5 is a structural diagram of a next-generation mobile communication network.

FIG. 5 is a structural diagram of a next-generation mobile communication network.

5GC (5G Core) may include various components, and in FIG. 5, AMF (Access and Mobility Management Function) 410, SMF (Session Management Function) 420, and PCF (Policy Control) corresponding to some of them Function) 430, UPF (User Plane Function) 440, AF (Application Function) 450, UDM (Unified Data Management) 460, and N3IWF (Non-3GPP InterWorking Function) 490.

The UE 100 is connected to a data network through the UPF 440 through a Next Generation Radio Access Network (NG-RAN).

The UE 100 may receive a data service through untrusted non-3rd Generation Partnership Project (non-3GPP) access, for example, a wireless local area network (WLAN). To connect the non-3GPP access to the core network, an N3IWF 490 may be deployed.

The illustrated N3IWF 490 performs a function of managing interworking between non-3GPP access and 5G systems. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through the N3 interface for data transmission.

The illustrated AMF 410 may manage access and mobility in a 5G system. The AMF 410 may perform a function of managing Non-Access Stratum (NAS) security. The AMF 410 may perform a function of handling mobility in an idle state.

The illustrated UPF 440 is a type of gateway through which user data is transmitted and received. The UPF node 440 may perform all or part of the user plane functions of a Serving Gateway (S-GW) and a Packet Data Network Gateway (P-GW) of 4G mobile communication.

The UPF 440 is an element that operates as a boundary point between the next generation RAN (NG-RAN) and the core network, and maintains a data path between the gNB 20 and the SMF 420. Also, when the UE 100 moves over an area served by the gNB 20, the UPF 440 serves as a mobility anchor point. The UPF 440 may perform a function of handling PDUs. For mobility within NG-RAN (Next Generation-Radio Access Network defined after 3GPP Release-15), UPF packets can be routed. In addition, the UPF 440 is another 3GPP network (RAN defined before 3GPP Release-15, for example, UTRAN, E-UTRAN (Evolved-Universal Mobile Telecommunications System (UMTS) Terrestrial Radio Access Network)) or GERAN (GSM (GSM)). It may function as an anchor point for mobility with Global System for Mobile Communication/EDGE (Enhanced Data rates for Global Evolution) Radio Access Network). UPF 440 may correspond to a termination point of a data interface towards a data network.

The illustrated PCF 430 is a node that controls the operator's policy.

The illustrated AF 450 is a server for providing various services to the UE 100.

The illustrated UDM 460 is a kind of server that manages subscriber information, like a home subscriber server (HSS) of 4G mobile communication. The UDM 460 stores and manages the subscriber information in a Unified Data Repository (UDR).

The illustrated SMF 420 may perform a function of allocating an Internet Protocol (IP) address of the UE. In addition, the SMF 420 may control a protocol data unit (PDU) session.

For reference, in the following AMF (410), SMF (420), PCF (430), UPF (440), AF (450), UDM (460), N3IWF (490), gNB (20), or UE (100) Reference numerals for may be omitted.

5G mobile communication supports multiple numerology or subcarrier spacing (SCS) to support various 5G services. For example, when SCS is 15 kHz, it supports a wide area in traditional cellular bands, and when SCS is 30 kHz/60 kHz, dense-urban, lower latency and wider carrier bandwidth, and when SCS is 60 kHz or higher, a bandwidth greater than 24.25 GHz to overcome phase noise.

Figure 6:
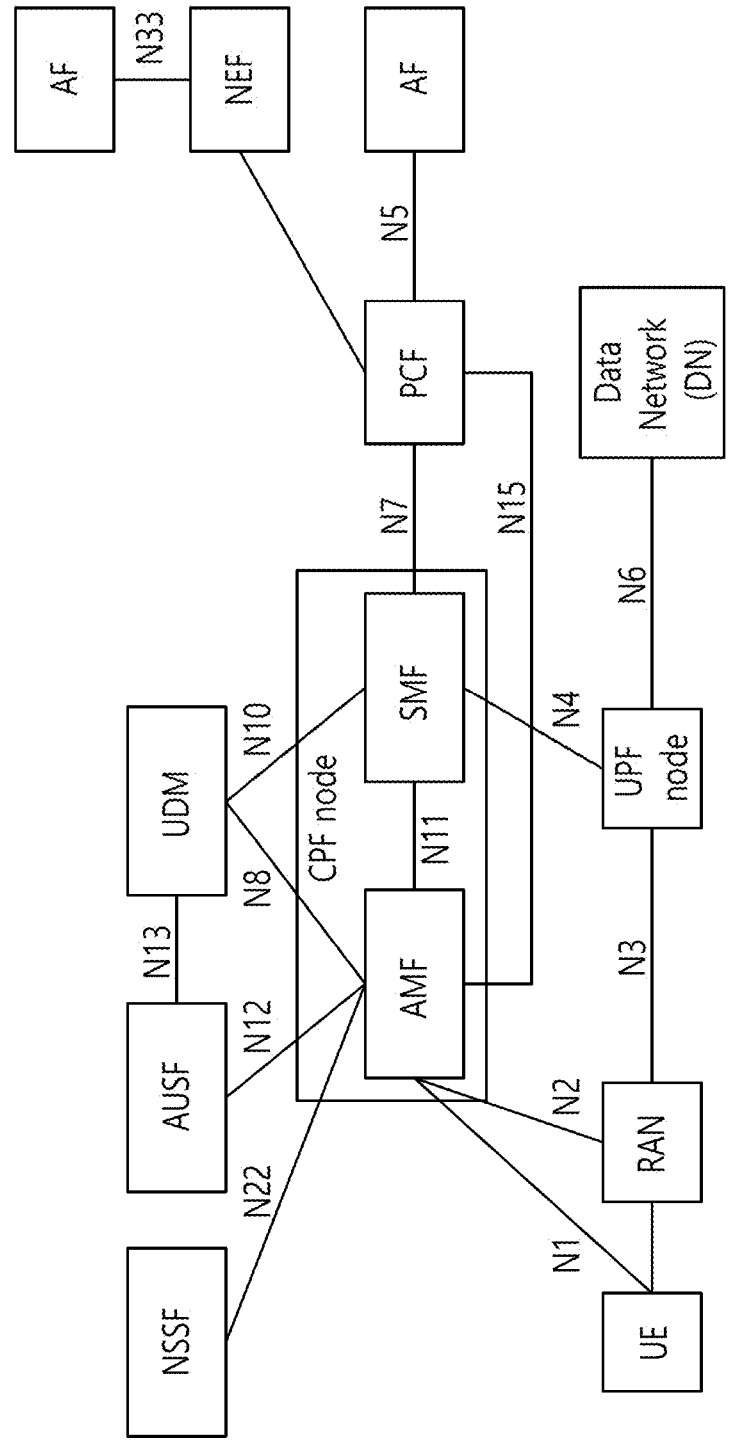
FIG. 6 is an exemplary diagram illustrating an expected structure of next-generation mobile communication from the viewpoint of a node.

FIG. 6 is an exemplary diagram illustrating an expected structure of next-generation mobile communication from the viewpoint of a node.

As can be seen with reference to FIG. 6, the UE is connected to a data network (DN) through a next-generation RAN (Radio Access Network).

The illustrated control plane function (CPF) node is all or part of the functions of the MME (Mobility Management Entity) of the 4th generation mobile communication, and the control plane functions of a Serving Gateway (S-GW) and a PDN Gateway (P-GW). carry out all or part of The CPF node includes an Access and Mobility Management Function (AMF) and a Session Management Function (SMF).

The illustrated User Plane Function (UPF) node is a type of gateway through which user data is transmitted and received. The UPF node may perform all or part of the user plane functions of the S-GW and P-GW of 4G mobile communication.

The illustrated PCF (Policy Control Function) is a node that controls the operator's policy.

The illustrated application function (Application Function: AF) is a server for providing various services to the UE.

The illustrated unified data management (UDM) is a kind of server that manages subscriber information, like a home subscriber server (HSS) of 4G mobile communication. The UDM stores and manages the subscriber information in a Unified Data Repository (UDR).

The illustrated Authentication Server Function (AUSF) authenticates and manages the UE.

The illustrated network slice selection function (NSSF) is a node for network slicing as will be described later.

Figure 7:
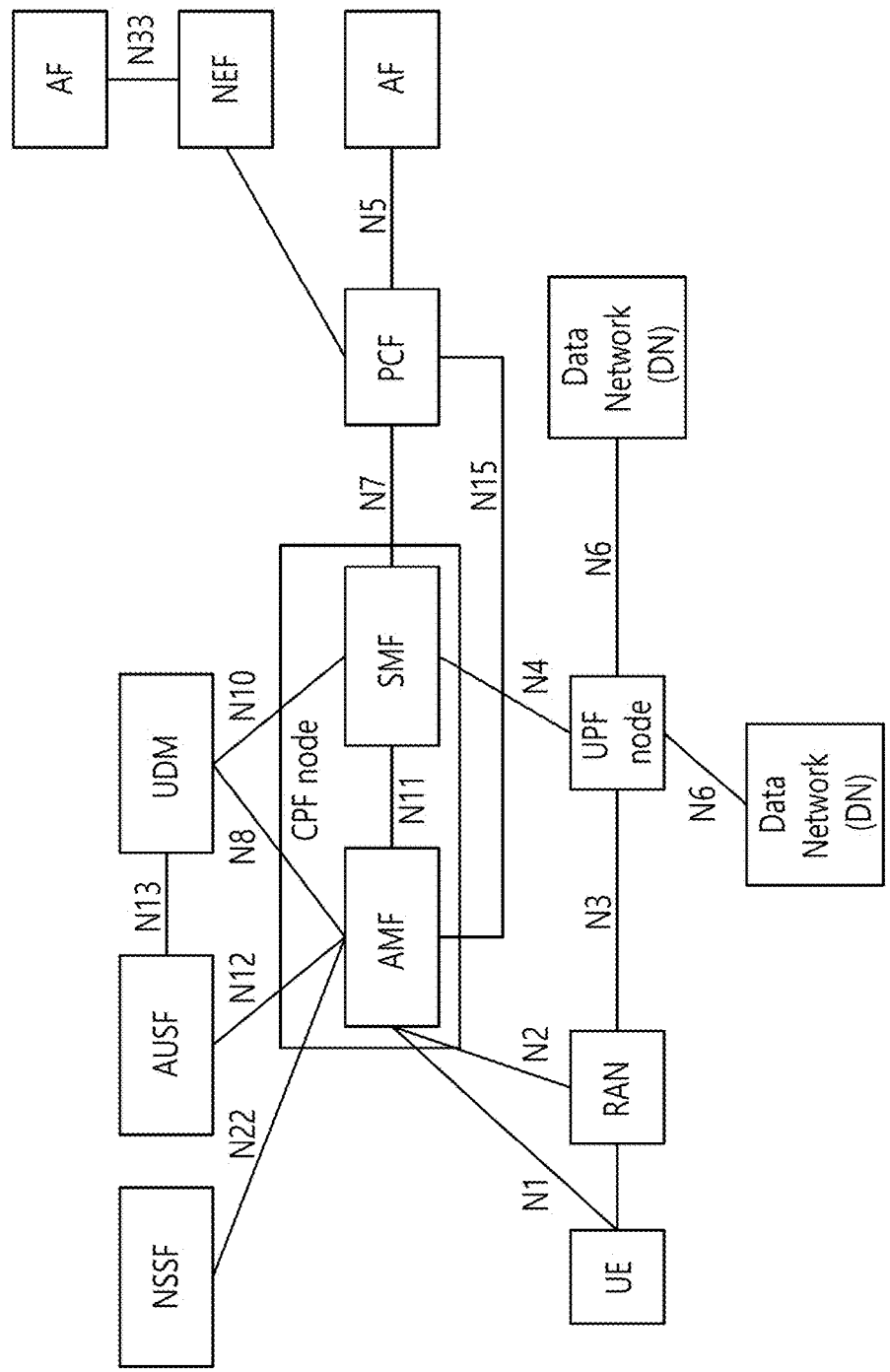
FIG. 7 is an exemplary diagram illustrating an architecture for supporting simultaneous access to two data networks.

In FIG. 7, a UE may simultaneously access two data networks using multiple PDU (protocol data unit or packet data unit) sessions.

FIG. 7 is an exemplary diagram illustrating an architecture for supporting simultaneous access to two data networks.

FIG. 7 shows an architecture for a UE to simultaneously access two data networks using one PDU session.

Reference points shown in FIGS. 3 and 4 are as follows.

N1 represents a reference point between the UE and the AMF.

N2 represents a reference point between (R)AN and AMF.

N3 represents the reference point between (R)AN and UPF.

N4 represents a reference point between SMF and UPF.

N5 represents the reference point between PCF and AF.

N6 represents a reference point between UPF and DN.

N7 represents a reference point between SMF and PCF.

N8 represents a reference point between UDM and AMF.

N9 represents a reference point between UPFs.

N10 represents a reference point between the UDM and the SMF.

N11 represents a reference point between AMF and SMF.

N12 represents a reference point between AMF and AUSF.

N13 represents a reference point between UDM and AUSF.

N14 represents a reference point between AMFs.

N15 represents a reference point between PCF and AMF.

N16 represents a reference point between SMFs.

N22 represents a reference point between the AMF and the NSSF.

N30 represents a reference point between the PCF and the NEF.

N33 represents a reference point between AF and NEF.

For reference, in FIGS. 6 and 7, AF by a third party other than an operator may be connected to 5GC through NEF.

<PDU Session Establishment>

A PDU session establishment procedure is described. Section 4.3.2 of 3GPP TS 23.502 V16.3.0 (2019 December) can be referred.

Figure 8:
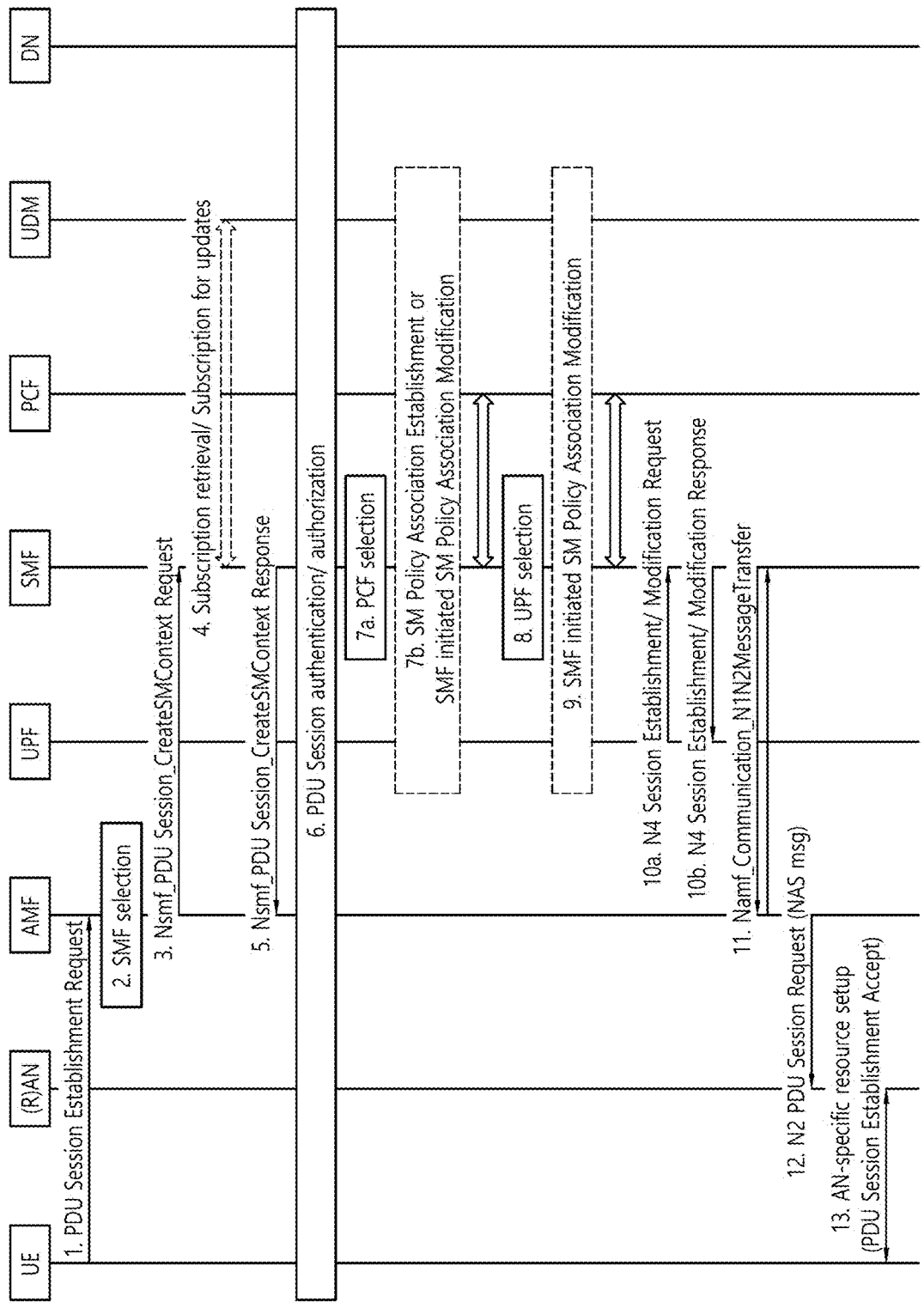
FIGS. 8 and 9 show an example of a PDU session establishment procedure to which implementations of the present disclosure is applied.
Figure 9:
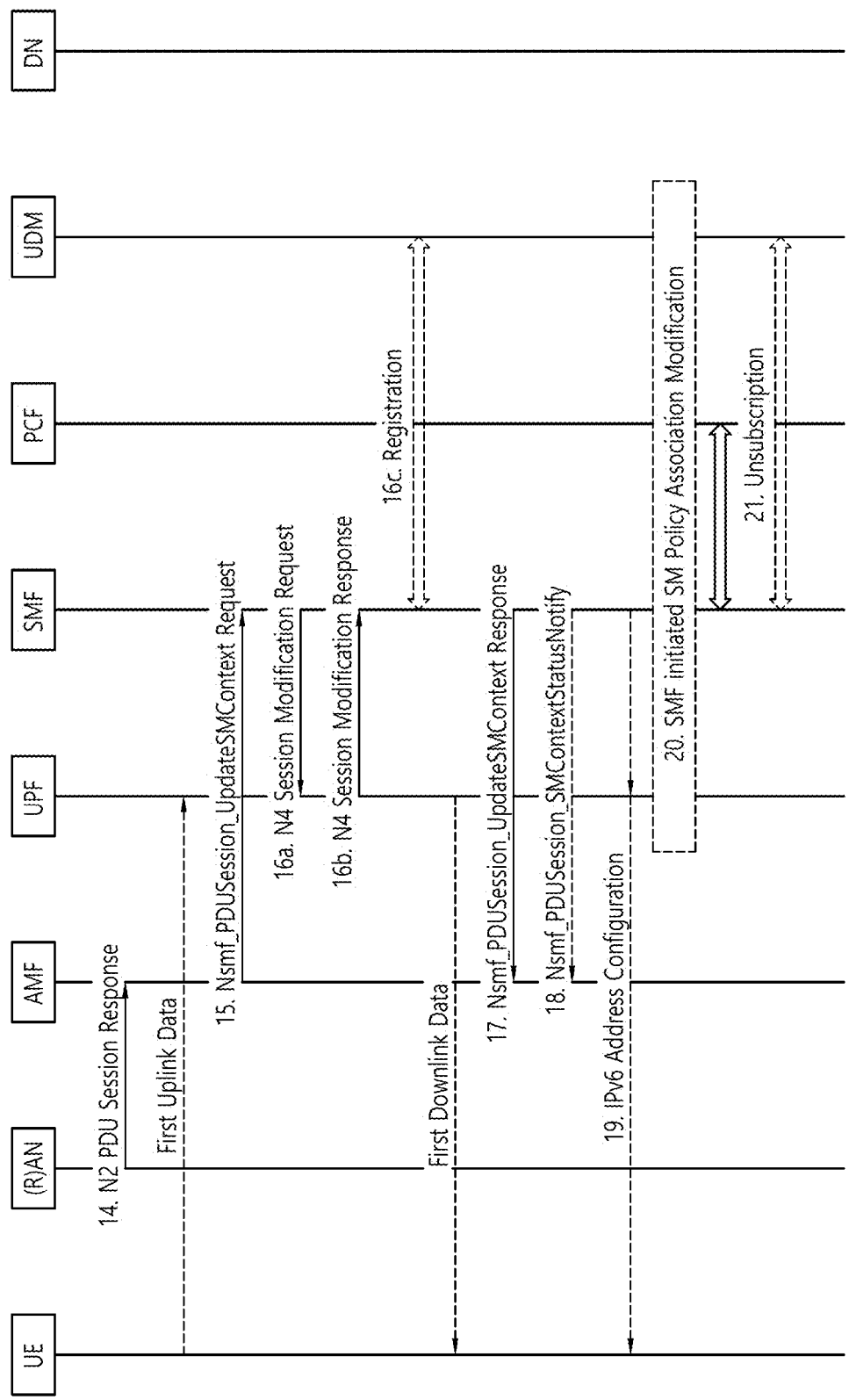

FIGS. 8 and 9 show an example of a PDU session establishment procedure to which implementations of the present disclosure is applied.

A PDU session establishment may correspond to:

a UE initiated PDU session establishment procedure.

a UE initiated PDU session handover between 3GPP and non-3GPP.

a UE initiated PDU session handover from EPS to 5GS.

a network triggered PDU session establishment procedure.

A PDU session may be associated either (a) with a single access type at a given time, i.e., either 3GPP access or non-3GPP access, or (b) simultaneously with multiple access types, i.e., one 3GPP access and one non-3GPP access. A PDU session associated with multiple access types is referred to as multi access PDU (MA PDU) session and it may be requested by access traffic steering, switching, splitting (ATSSS)-capable UEs.

FIGS. 8 and 9 specify the procedures for establishing PDU sessions associated with a single access type at a given time.

The procedure shown in FIGS. 8 and 9 assumes that the UE has already registered on the AMF thus unless the UE is emergency registered the AMF has already retrieved the user subscription data from the UDM.

First, procedures of FIG. 8 are described.

(1) Step 1: In order to establish a new PDU session, the UE generates a new PDU session ID.

The UE initiates the UE requested PDU session establishment procedure by the transmission of a NAS message containing a PDU Session Establishment Request message within the N1 SM container. The PDU Session Establishment Request message includes a PDU session ID, Requested PDU Session Type, a Requested session and service continuity (SSC) mode, 5GSM Capability, protocol configuration options (PCO), SM PDU DN Request Container, UE Integrity Protection Maximum Data Rate, etc.

The Request Type indicates "Initial request" if the PDU session establishment is a request to establish a new PDU session and indicates "Existing PDU Session" if the request refers to an existing PDU session switching between 3GPP access and non-3GPP access or to a PDU session handover from an existing packet data network (PDN) connection in EPC. The Request Type indicates "Emergency Request" if the PDU session establishment is a request to establish a PDU session for emergency services. The Request Type indicates "Existing Emergency PDU Session" if the request refers to an existing PDU session for emergency services switching between 3GPP access and non-3GPP access or to a PDU session handover from an existing PDN connection for emergency services in EPC.

The UE includes the S-NSSAI from the Allowed NSSAI of the current access type. If the Mapping of Allowed NSSAI was provided to the UE, the UE shall provide both the S-NSSAI of the visited PLMN (VPLMN) from the Allowed NSSAI and the corresponding S-NSSAI of the HPLMN from the Mapping Of Allowed NSSAI.

(2) Step 2: The AMF selects an SMF. If the Request Type indicates "Initial request" or the request is due to handover from EPS or from non-3GPP access serving by a different AMF, the AMF stores an association of the S-NSSAI(s), the data network name (DNN), the PDU session ID, the SMF ID as well as the Access Type of the PDU session.

If the Request Type is "initial request" and if the Old PDU session ID indicating the existing PDU session is also contained in the message, the AMF selects an SMF and stores an association of the new PDU Session ID, the S-NSSAI(s), the selected SMF ID as well as Access Type of the PDU Session.

If the Request Type indicates "Existing PDU Session", the AMF selects the SMF based on SMF-ID received from UDM. The AMF updates the Access Type stored for the PDU session.

If the Request Type indicates "Existing PDU Session" referring to an existing PDU session moved between 3GPP access and non-3GPP access, then if the serving PLMN S-NSSAI of the PDU session is present in the Allowed NSSAI of the target access type, the PDU session establishment procedure can be performed in the following cases:

the SMF ID corresponding to the PDU session ID and the AMF belong to the same PLMN;

the SMF ID corresponding to the PDU session ID belongs to the HPLMN;

Otherwise the AMF shall reject the PDU session establishment request with an appropriate reject cause.

The AMF shall reject a request coming from an emergency registered UE and the Request Type indicates neither "Emergency Request" nor "Existing Emergency PDU Session".

(3) Step 3: If the AMF does not have an association with an SMF for the PDU session ID provided by the UE (e.g., when Request Type indicates "initial request"), the AMF invokes Create SM Context Request procedure (e.g., Nsmf_PDUSession_CreateSMContext Request). If the AMF already has an association with an SMF for the PDU session ID provided by the UE (e.g., when Request Type indicates "existing PDU Session"), the AMF invokes Update SM Context Request procedure (e.g., Nsmf_PDUSession_UpdateSMContext Request).

The AMF sends the S-NSSAI of the serving PLMN from the Allowed NSSAI to the SMF. For roaming scenario in local breakout (LBO), the AMF also sends the corresponding S-NSSAI of the HPLMN from the Mapping Of Allowed NSSAI to the SMF.

The AMF ID is the UE's GUAMI which uniquely identifies the AMF serving the UE. The AMF forwards the PDU session ID together with the N1 SM container containing the PDU Session Establishment Request message received from the UE. The generic public subscription identifier (GPSI) shall be included if available at AMF.

The AMF provides the PEI instead of the SUPI when the UE in limited service state has registered for emergency services without providing a SUPI. In case the UE in limited service state has registered for Emergency services with a SUPI but has not been authenticated, the AMF indicates that the SUPI has not been authenticated. The SMF determines that the UE has not been authenticated when it does not receive a SUPI for the UE or when the AMF indicates that the SUPI has not been authenticated.

The AMF may include a PCF ID in the Nsmf_PDUSession_CreateSMContext Request. This PCF ID identifies the home PCF (H-PCF) in the non-roaming case and the visited PCF (V-PCF) in the LBO roaming case.

(4) Step 4: If session management subscription data for corresponding SUPI, DNN and S-NSSAI of the HPLMN is not available, then SMF may retrieve the session management subscription data from the UDM and subscribes to be notified when this subscription data is modified.

(5) Step 5: The SMF transmits either Create SM Context Response message (e.g., Nsmf_PDUSession_CreateSMContext Response) or Update SM Context Response message (e.g., Nsmf_PDUSession_UpdateSMContext Response) to the AMF, depending on the request received in step 3.

If the SMF received Nsmf_PDUSession_CreateSMContext Request in step 3 and the SMF is able to process the PDU session establishment request, the SMF creates an SM context and responds to the AMF by providing an SM Context ID.

When the SMF decides to not accept to establish a PDU session, the SMF rejects the UE request via NAS SM signaling including a relevant SM rejection cause by responding to the AMF with Nsmf_PDUSession_CreateSMContext Response. The SMF also indicates to the AMF that the PDU session ID is to be considered as released, the SMF proceeds to step 20 below and the PDU session establishment procedure is stopped.

(6) Step 6: Optional secondary authentication/authorization may be performed.

(7a) Step 7a: If dynamic policy and charging control (PCC) is to be used for the PDU session, the SMF may perform PCF selection.

(7b) Step 7b: The SMF may perform an SM Policy Association Establishment procedure to establish an SM Policy association with the PCF and get the default PCC rules for the PDU session.

(8) Step 8: The SMF selects one or more UPFs.

(9) Step 9: The SMF may perform an SMF initiated SM Policy Association Modification procedure to provide information on the policy control request trigger condition(s) that have been met.

(10) Step 10: If Request Type indicates "initial request", the SMF may initiate an N4 Session Establishment procedure with the selected UPF. Otherwise, the SMF may initiate an N4 Session Modification procedure with the selected UPF In step 10a, the SMF may send an N4 Session Establishment/Modification Request to the UPF and provides packet detection, enforcement and reporting rules to be installed on the UPF for this PDU session. In step 10b, the UPF may acknowledge by sending an N4 Session Establishment/Modification Response.

(11) Step 11: The SMF transmits a N1N2Message Transfer message (e.g., Namf_Communication_N1N2MessageTransfer) to the AMF.

The N1N2Message Transfer message may include N2 SM information. The N2 SM information carries information that the AMF shall forward to the (R)AN which may include:

The CN Tunnel Info: Core network address(es) of the N3 tunnel corresponding to the PDU session;

One or multiple quality of service (QoS) profiles and the corresponding QoS flow IDs (QFIs);

The PDU session ID: indicate to the UE the association between (R)AN resources and a PDU session for the UE.

S-NSSAI with the value for the serving PLMN (i.e., the HPLMN S-NSSAI or, in LBO roaming case, the VPLMN S-NSSAI).

User Plane Security Enforcement information determined by the SMF.

If the User Plane Security Enforcement information indicates that integrity protection is "Preferred" or "Required", the SMF also includes the UE Integrity Protection Maximum Data Rate as received in the PDU Session Establishment Request message.

Redundancy sequence number (RSN) parameter

The N1N2Message Transfer message may include N1 SM container. The N1 SM container contains the PDU Session Establishment Accept message that the AMF shall provide to the UE. The PDU Session Establishment Accept message includes S-NSSAI from the Allowed NSSAI. For LBO roaming scenario, the PDU Session Establishment Accept message includes the S-NSSAI from the Allowed NSSAI for the VPLMN and also it includes the corresponding S-NSSAI of the HPLMN from the Mapping Of Allowed NSSAI that SMF received in step 3.

Multiple QoS Rules, QoS flow level, QoS parameters if needed for the QoS Flow(s) associated with those QoS rule(s) and QoS Profiles may be included in the PDU Session Establishment Accept message within the N1 SM container and in the N2 SM information.

If the PDU session establishment failed anywhere between step 5 and step 11, then the N1N2Message Transfer message shall include the N1 SM container with a PDU Session Establishment Reject message and shall not include any N2 SM information. The (R)AN sends the NAS message containing the PDU Session Establishment Reject message to the UE. In this case, steps 12-17 are skipped.

(12) Step 12: The AMF sends the NAS message containing PDU Session ID and PDU Session Establishment Accept message targeted to the UE and the N2 SM information received from the SMF within the N2 PDU Session Request message to the (R)AN.

(13) Step 13: The (R)AN may issue AN specific signaling exchange with the UE that is related with the information received from SMF. For example, in case of a NG-RAN, an RRC connection reconfiguration may take place with the UE establishing the necessary NG-RAN resources related to the QoS rules for the PDU session request received in step 12.

The (R)AN forwards the NAS message (PDU Session ID, N1 SM container (PDU Session Establishment Accept message)) provided in step 12 to the UE. The (R)AN shall only provide the NAS message to the UE if the AN specific signaling exchange with the UE includes the (R)AN resource additions associated to the received N2 command.

If the N2 SM information is not included in the step 11, then the following steps 14 to 16b and step 17 are omitted.

Now, procedures of FIG. 9, which follow the procedures of FIG. 8, are described.

(14) Step 14: The (R)AN transmits a N2 PDU Session Response message to the AMF. The N2 PDU Session Response message may include PDU session ID, Cause, N2 SM information (PDU Session ID, AN Tunnel Info, List of accepted/rejected QFI(s), User Plane Enforcement Policy Notification)), etc.

(15) Step 15: The AMF transmits an Update SM Context Request message (e.g., Nsmf_PDUSession_UpdateSMContext Request) to the SMF. The AMF forwards the N2 SM information received from (R)AN to the SMF.

(16a) Step S16a: The SMF initiates an N4 Session Modification procedure with the UPF. The SMF provides AN Tunnel Info to the UPF as well as the corresponding forwarding rules.

(16b) Step S16b: The UPF provides an N4 Session Modification Response to the SMF.

After this step, the UPF may deliver any DL packets to the UE that may have been buffered for this PDU session.

(16c) Step 16c: If the SMF has not yet registered for this PDU session, then the SMF may register with the UDM for a given PDU Session.

(17) Step 17: The SMF transmits an Update SM Context Response message (e.g., Nsmf_PDUSession_UpdateSM-Context Response) to the AMF.

After this step, the AMF forwards relevant events subscribed by the SMF.

(18) Step 18: If during the procedure, any time after step 5, the PDU session establishment is not successful, the SMF may inform the AMF by invoking Nsmf_PDUSession_SM-ContextStatusNotify (Release). The SMF may also release any N4 session(s) created, any PDU session address if allocated (e.g., IP address) and release the association with PCF, if any. In this case, step 19 is skipped.

(19) Step 19: In the case of PDU Session Type IPv6 or IPv4v6, the SMF may generate an IPv6 Router Advertisement and send it to the UE.

(20) Step 20: The SMF may perform SMF initiated SM Policy Association Modification.

(21) Step 21: If the PDU Session establishment failed after step 4, the SMF may unsubscribe to the modifications of session management subscription data, if the SMF is no more handling a PDU session of the UE.

<Multi-Access (MA) PDU Session>

The MA PDU session is a session that can be serviced simultaneously with 3GPP access and non-3GPP access using one PDU session.

Figure 10:
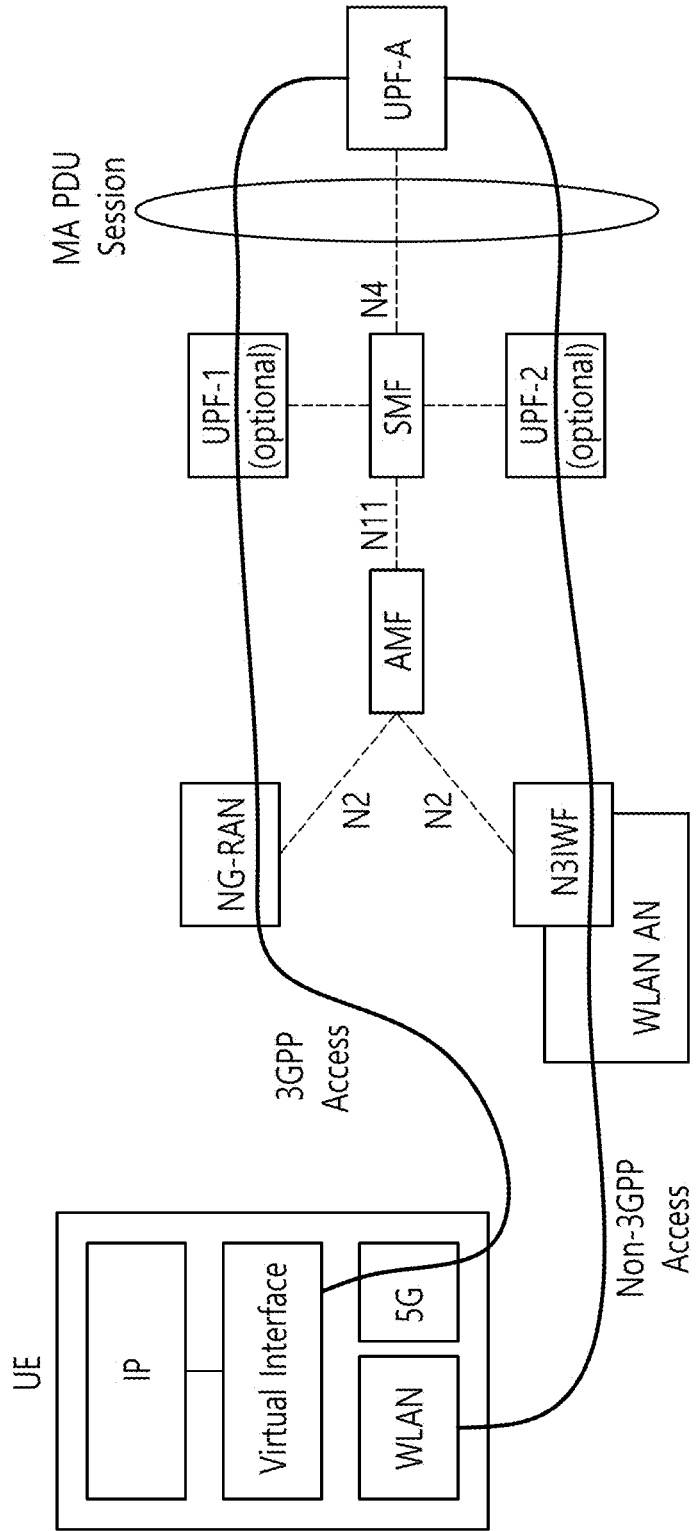
FIG. 10 shows an example in which an MA PDU session is generated.

FIG. 10 shows an example in which an MA PDU session is generated.

The MA PDU session is one PDU session in FIG. 10 and has a separate session tunnel for each access. One is established on 3GPP access, and the other PDU session is established on untrusted non-3GPP access (eg, WLAN AN).

Since it is one session in the MA-PDU session, the MA PDU session has the following characteristics.

(i) one DNN;
(ii) one UPF anchor (UPF-A);
(iii) one PDU type (eg, IPv6);
(iv) one session IP address
(v) one SSC mode
(vi) one HPLMN S-NSSAI.

The MA-PDU session enables a multipath data link between the UE and UPF-A. This may be implemented below the IP layer.

A MA-PDU session may be established through one of the following procedures.

(i) It can be established through two separate PDU session establishment procedures. This is called individual establishment.

(ii) may be established through one MA PDU session establishment procedure. That is, the MA PDU session is simultaneously established in two accesses with one session creation request. This is called binding establishment.

After the MA-PDU session is established, SM (Session Management) signaling related to the MA PDU session may be transmitted and received through random access.

A. Individual Establishment of MA PDU Session

A MA PDU session may be established through two separate PDU session establishment procedures. For example, the UE may establish a MA PDU session on 3GPP access, and then perform a PDU session establishment procedure to add non-3GPP access to the MA PDU session created on 3GPP access on non-3GPP access. The request type in the establishment request message for adding the second access may be set to "MA PDU Request".

B. Establish a Bond

A MA PDU session may be established for 3GPP access and non-3GPP access at the same time through one procedure. One such procedure may be referred to as an MA PDU session establishment procedure by UE request. The above procedure may be useful when the UE intends to establish a MA PDU session while the UE is already registered with 5GC through two accesses. Instead of performing two separate PDU session establishment procedures, the UE may establish a MA PDU session by performing one MA PDU session establishment procedure.

A MA PDU session is a session that can be serviced simultaneously with 3GPP access and non-3GPP access using one PDU session.

C. ATSSS

The ATSSS (Access Traffic Steering, Switching and Splitting) feature is an optional feature that may be supported by the UE and the 5GC network.

The ATSSS feature enables a multi-access PDU Connectivity Service, which can exchange PDUs between the UE and a data network by simultaneously using one 3GPP access network and one non-3GPP access network and two independent N3/N9 tunnels between the PSA and RAN/AN. The multi-access PDU Connectivity Service is realized by establishing a Multi-Access PDU (MA PDU) Session, i.e. a PDU Session that may have user-plane resources on two access networks.

The UE may request a MA PDU Session when the UE is registered via both 3GPP and non-3GPP accesses, or when the UE is registered via one access only.

After the establishment of a MA PDU Session, and when there are user-plane resources on both access networks, the UE applies network-provided policy (i.e. ATSSS rules) and considers local conditions (such as network interface availability, signal loss conditions, user preferences, etc.) for deciding how to distribute the uplink traffic across the two access networks. Similarly, the UPF anchor of the MA PDU Session applies network-provided policy (i.e. N4 rules) and feedback information received from the UE via the user-plane (such as access network Unavailability or Availability) for deciding how to distribute the downlink traffic across the two N3/N9 tunnels and two access networks. When there are user-plane resources on only one access network, the UE applies the ATSSS rules and considers local conditions for triggering the establishment or activation of the user plane resources over another access.

In the PDU Session Establishment Request that is sent to request a new MA PDU Session, the UE shall provide also its ATSSS capabilities, which indicate the steering functionalities and the steering modes supported in the UE.

If the UE indicates it is capable of supporting the ATSSS-LL functionality with any steering mode and the network accepts to activate this functionality, then the network may provide to UE Measurement Assistance Information and shall provide to UE one or more ATSSS rules.

The SMF determines the ATSSS capabilities supported for the MA PDU Session based on the ATSSS capabilities provided by the UE and per DNN configuration on SMF.

<Access Network Performance Measurements>

When an MA PDU Session is established, the network may provide the UE with Measurement Assistance Information. This information assists the UE in determining which measurements shall be performed over both accesses, as well as whether measurement reports need to be sent to the network.

Measurement Assistance Information shall include the addressing information of a Performance Measurement Function (PMF) in the UPF, the UE can send PMF protocol messages to:

For a PDU Session of IP type, Measurement Assistance Information contains one IP address for the PMF, one UDP port associated with 3GPP access and another UDP port associated with non-3GPP access;

For a PDU Session of Ethernet type, Measurement Assistance Information contains one MAC address associated with 3GPP access and another MAC address associated with non-3GPP access.

NOTE 1: To protect the PMF in the UPF (e.g. to block DDOS to the PMF), the IP addresses of the PMF are only accessible from the UE IP address via the N3/N9 interface.

NOTE 2: After the MA PDU Session is released, the same UE IP address/prefix is not allocated to another UE for MA PDU Session in a short time.

The addressing information of the PMF in the UPF is retrieved by the SMF from the UPF during N4 session establishment.

The following PMF protocol messages can be exchanged between the UE and the PMF:

Messages to allow for Round Trip Time (RTT) measurements, i.e. when the "Smallest Delay" steering mode is used;

Messages for reporting Access availability/unavailability by the UE to the UPF.

The PMF protocol messages exchanged between the UE and UPF shall use the QoS Flow associated with default QoS rule over the available access(es).

The QoS Flow associated with default QoS rule for MA PDU Session is Non-GBR QoS Flow.

The UE shall not apply the ATSSS rules and the UPF shall not apply the MAR rules for the PMF protocol messages.

When the UE requests a MA PDU session and indicates it is capable to support the MPTCP functionality with any steering mode and the ATSSS-LL functionality with only the Active-Standby steering mode, the network may send Measurement Assistance Information for the UE to send Access availability/unavailability reports to the UPF. In this case, the UE and UPF shall not perform RTT measurements using PMF as the UE and UPF can use measurements available at the MPTCP layer.

1. Round Trip Time Measurements

RTT measurements can be conducted by the UE and UPF independently. There is no measurement reporting from one side to the other. RTT measurements are defined to support the "Smallest Delay" steering mode.

The estimation of the RTT by the UE and by the UPF is based on the following mechanism:

1) The PMF in the UE sends over the user plane PMF-Echo Request messages to the PMF in the UPF, and the PMF in the UPF responds to each one with a PMF-Echo Response message. Similarly, the PMF in the UPF sends over the user plane PMF-Echo Request messages to the PMF in the UE, and the PMF in the UE responds to each one with a PMF-Echo Response message.

2) In the case of a MA PDU Session of IP type:

The PMF in the UE sends PMF messages to the PMF in the UPF over UDP/IP. The destination IP address is the IP address contained in the Measurement Assistance Information and the destination UDP port is one of the two UDP ports contained in the Measurement Assistance Information. One UDP port is used for sending PMF messages to UPF over 3GPP access and the other UDP port is used for sending PMF messages to UPF over non-3GPP access. The source IP address is the IP address assigned to UE for the MA PDU Session and the source UDP port is a UDP port that is dynamically allocated by the UE for PMF communication. This source UDP port in the UE remains the same for the entire lifetime of the MA PDU Session.

The PMF in the UPF sends PMF messages to the PMF in the UE over UDP/IP. The source IP address is the same IP address as the one provided in the Measurement Assistance Information and the source UDP port is one of the two UDP ports as provided in the Measurement Assistance Information. One UDP port is used for sending PMF messages to UE over 3GPP access and the other UDP port is used for sending PMF messages to UE over the non-3GPP access. The destination IPv4 address is the IPv4 address assigned to UE for the MA PDU Session (if any) and the destination IPv6 address is an IPv6 address selected by the UE from the IPv6 prefix assigned for the MA PDU Session (if any). The destination UDP port is the dynamically allocated UDP port in the UE, which is contained in all PMF messages received from the UE. If the UE receives Measurement Assistance Information, the UE shall inform the network via the user plane about the UE's dynamically allocated UDP port, and the IPv6 address if IPv6 is used for PMF messages, so that it is possible for the UPF to know the UE's IPv6 address (if applicable) and dynamically allocated UDP port as soon as the MA PDU Session has been established.

3) In the case of a MA PDU Session of Ethernet type:

The PMF in the UE sends PMF messages to the PMF in the UPF over Ethernet. The Ethertype is the Ethertype contained in the Measurement Assistance Information and the destination MAC address is one of the two MAC addresses contained in the Measurement Assistance Information. One MAC address is used for sending PMF messages to UPF over 3GPP access and the other MAC address is used for sending PMF messages to UPF over non-3GPP access. The source MAC address is a MAC address of the UE, which remains the same for the entire lifetime of the MA PDU Session.

The PMF in the UPF sends PMF messages to the PMF in the UE over Ethernet. The Ethertype is the same Ethertype as the one provided in the Measurement Assistance Information and the source MAC address is one of the two MAC addresses as provided in the Measurement Assistance Information. One MAC address is used for sending PMF messages to UE over 3GPP access and the other MAC address is used for sending PMF messages to UE over non-3GPP access. The destination MAC address is the MAC address of the UE, which is contained in all PMF messages received from the UE. If the UE receives Measurement Assistance Information, the UE shall inform the network via the user plane about the UE's MAC address so that it is possible for the UPF to know the UE's MAC address as soon as the MA PDU Session has been established.

4) When the UP connection of the MA PDU session is deactivated on an access, no PMF-Echo Request messages are sent on this access. The PMF in the UPF shall not send PMF-Echo Request on this access if the UP connection is not available or after it receives notification from the (H-)SMF to stop sending the PMF-Echo Request on this access.

5) The UE and the UPF derive an estimation of the average RTT over an access type by averaging the RTT measurements obtained over this access.

2. Access Availability/Unavailability Report

If required by the network in the Measurement Assistance Information, the UE shall provide access availability/unavailability reports to the network. How the UE detects the unavailability and the availability of an access is based on implementation. When the UE detects the unavailability/availability of an access, it shall:

build a PMF-Access Report containing the access type and an indication of availability/unavailability of this access;

send the PMF-Access Report to the UPF via the user plane.

The UPF shall acknowledge the PMF-Access Report received from the UE.

<Support of Steering Functionalities>

The functionality in an ATSSS-capable UE that can steer, switch and split the MA PDU Session traffic across 3GPP access and non-3GPP access, is called a "steering functionality". An ATSSS-capable UE may support one or more of the following types of steering functionalities:

High-layer steering functionalities, which operate above the IP layer:

In this release of the specification, only one high-layer steering functionality is specified, which applies the MPTCP protocol (IETF RFC 8684 [81]) and is called "MPTCP functionality". This steering functionality can be applied to steer, switch and split the TCP traffic of applications allowed to use MPTCP. The MPTCP functionality in the UE may communicate with an associated MPTCP Proxy functionality in the UPF, by using the MPTCP protocol over the 3GPP and/or the non-3GPP user plane.

Low-layer steering functionalities, which operate below the IP layer:

One type of low-layer steering functionality defined in the present document is called "ATSSS Low-Layer functionality", or ATSSS-LL functionality. This steering functionality can be applied to steer, switch and split all types of traffic, including TCP traffic, UDP traffic, Ethernet traffic, etc. ATSSS-LL functionality is mandatory for MA PDU Session of type Ethernet. In the network, there shall be in the data path of the MA PDU session one UPF supporting ATSSS-LL.

NOTE: Filters used in ATSSS rules related with a MA PDU Session of type Ethernet can refer to IP level parameters such as IP addresses and TCP/UDP ports.

The UE indicates to the network its supported steering functionalities and steering modes by including in the UE ATSSS Capability one of the following:

1) ATSSS-LL functionality with any steering mode.

In this case, the UE indicates that it is capable to steer, switch and split all traffic of the MA PDU Session by using the ATSSS-LL functionality with any steering mode.

2) MPTCP functionality with any steering mode and ATSSS-LL functionality with only Active-Standby steering mode.

In this case, the UE indicates that:

a) it is capable to steer, switch and split the MPTCP traffic of the MA PDU Session by using the MPTCP functionality with any steering mode; and b) it is capable to steer and switch all other traffic (i.e. the non-MPTCP traffic) of the MA PDU Session by using the ATSSS-LL functionality with the Active-Standby steering mode.

with any steering mode and ATSSS-LL functionality with any steering mode.

In this case, the UE indicates that:

a) it is capable to steer, switch and split the MPTCP traffic of the MA PDU Session by using the MPTCP functionality with any steering mode; and b) it is capable to steer, switch and split all other traffic (i.e. the non-MPTCP traffic) of the MA PDU Session by using the ATSSS-LL functionality with any steering mode.

Figure 11:
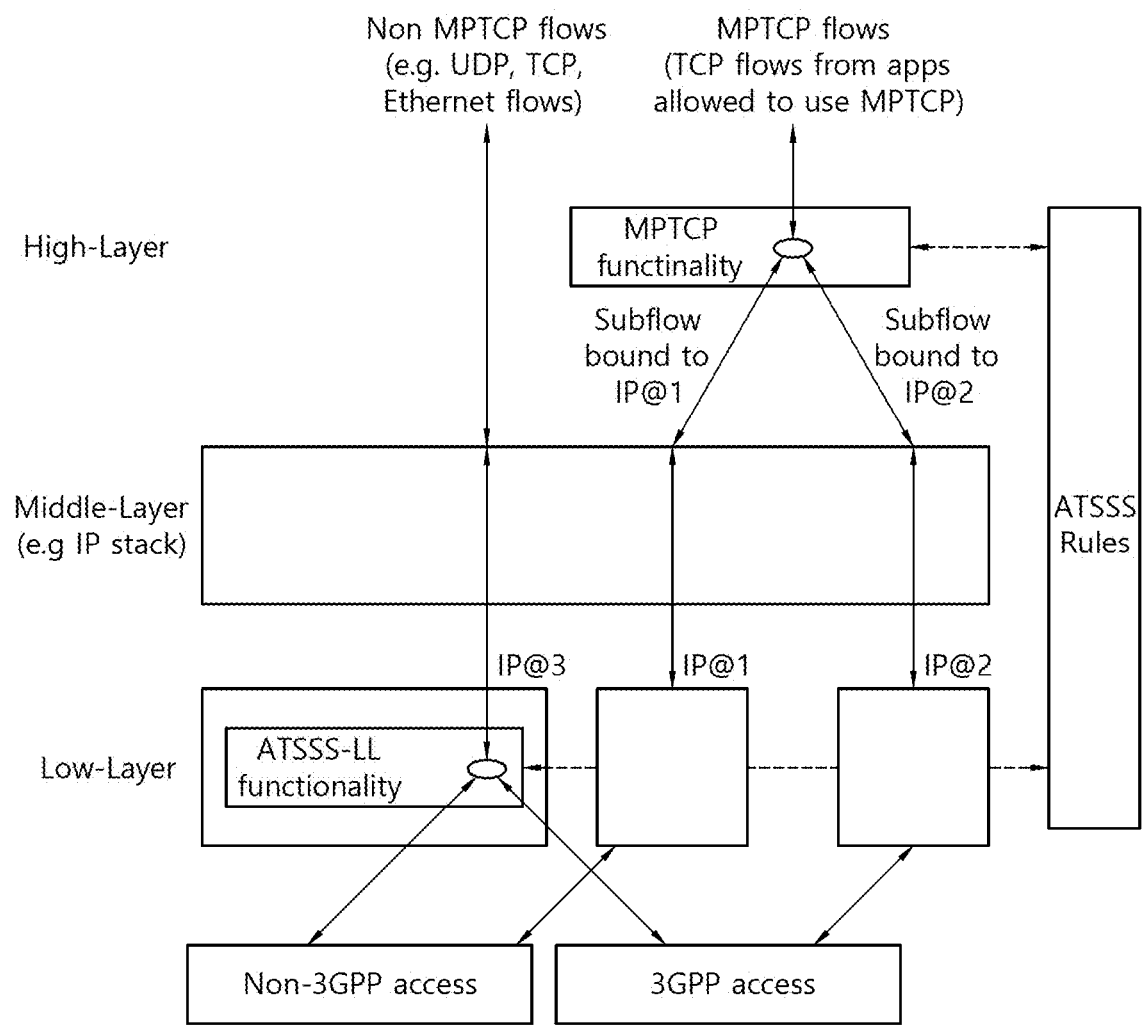
FIG. 11 shows Steering functionalities in an example UE model.

FIG. 11 shows Steering functionalities in an example UE model.

The above steering functionalities are schematically illustrated in the FIG. 11, which shows an example model for an ATSSS-capable UE supporting the MPTCP functionality and the ATSSS-LL functionality. The MPTCP flows in this figure represent the traffic of the applications for which MPTCP can be applied. The three different IP addresses illustrated in the UE are later. The "Low-Layer" in this figure contains functionality that operates below the IP layer (e.g. different network interfaces in the UE), while the "High-Layer" contains functionality that operates above the IP layer.

Within the same MA PDU Session in the UE, it is possible to steer the MPTCP flows by using the MPTCP functionality and, simultaneously, to steer all other flows by using the ATSSS-LL functionality. For the same packet flow, only one steering functionality shall be used.

All steering functionalities in the UE shall take ATSSS decisions (i.e. decide how to steer, switch and split the traffic) by using the same set of ATSSS rules. Similarly, all ATSSS decisions in the UPF shall be taken by applying the same set of N4 rules, which support ATSSS. The ATSSS rules and the N4 rules supporting ATSSS are provisioned in the UE and in the UPF respectively, when the MA PDU Session is established.

If the UE supports both the MPTCP functionality and the ATSSS-LL functionality, it shall use the provisioned ATSSS rules (see TS 23.503 [45]) to decide which steering functionality to apply for a specific packet flow.

1. High-Layer Steering Functionalities

The MPTCP functionality in the UE applies the MPTCP protocol (IETF RFC 8684 [81]) and the provisioned ATSSS rules for performing access traffic steering, switching and splitting. The MPTCP functionality in the UE may communicate with the MPTCP Proxy functionality in the UPF using the user plane of the 3GPP access, or the non-3GPP access, or both.

The MPTCP functionality may be enabled in the UE when the UE provides an "MPTCP capability" during PDU Session Establishment procedure.

The network shall not enable the MPTCP functionality when the type of the MA PDU Session is Ethernet.

If the UE indicates it is capable of supporting the MPTCP functionality, and the network agrees to enable the MPTCP functionality for the MA PDU Session then:

i) An associated MPTCP Proxy functionality is enabled in the UPF for the MA PDU Session by MPTCP functionality indication received in the Multi-Access Rules (MAR).

ii) The network allocates to UE one IP address/prefix for the MA PDU Session and two additional IP addresses/prefixes, called "link-specific multipath" addresses/prefixes; one associated with 3GPP access and another associated with the non-3GPP access. In the UE, these two IP addresses/prefixes are used only by the MPTCP functionality. Each "link-specific multipath" address/prefix assigned to UE may not be routable via N6. The MPTCP functionality in the UE and the MPTCP Proxy functionality in the UPF shall use the "link-specific multipath" addresses/prefixes for subflows over non-3GPP access and over 3GPP access and MPTCP Proxy functionality shall use the IP address/prefix of the MA PDU session for the communication with the final destination. In FIG. 11, the IP@3 corresponds to the IP address of the MA PDU Session and the IP@1 and IP@2 correspond to the "link-specific multipath" IP addresses. The following UE IP address management applies:

The MA PDU IP address/prefix shall be provided to the UE.

The "link-specific multipath" IP addresses/prefixes shall be allocated by the UPF and shall be provided to the UE via SM NAS signalling.

NOTE 1: After the MA PDU Session is released, the same UE IP addresses/prefixes is not allocated to another UE for MA PDU Session in a short time.

NOTE 2: The act of the UPF performing translation on traffic associated with the "link-specific multipath" addresses to/from the MA PDU session IP address can lead to TCP port collision and exhaustion. The port collision can potentially occur because the UE also uses the MA PDU session IP address for non-MPTCP traffic, and this causes the port namespace of such address to be owned simultaneously by the UE and UPF. In addition, the port exhaustion can potentially occur when the UE creates a large number of flows, because multiple IP addresses used by the UE are mapped to a single MA PDU session IP address on the UPF. The UPF needs to consider these problems based on the UPF implementation, and avoid them by, for example, using additional N6-routable IP addresses for traffic associated to the link-specific multipath addresses/prefixes. How this is done is left to the implementation.

iii) The network shall send MPTCP proxy information to UE, i.e. the IP address, a port number and the type of the MPTCP proxy. The following type of MPTCP proxy shall be supported in this release:

Type 1: Transport Converter, as defined in draft-ietf-tcpm-converters-14 [82].

The MPTCP proxy information is retrieved by the SMF from the UPF during N4 session establishment.

The UE shall support the client extensions specified in draft-ietf-tcpm-converters-14 [82].

iv) The network may indicate to UE the list of applications for which the MPTCP functionality should be applied. This is achieved by using the Steering Functionality component of an ATSSS rule.

NOTE 3: To protect the MPTCP proxy function (e.g. to block DDOS to the MPTCP proxy function), the IP addresses of the MPTCP Proxy Function are only accessible from the two "link-specific multipath" IP addresses of the UE via the N3/N9 interface.

v) When the UE indicates it is capable of supporting the MPTCP functionality with any steering mode and the ATSSS-LL functionality with only the Active-Standby steering mode and these functionalities are enabled for the MA PDU Session, then the UE shall route via the MA PDU Session the TCP traffic of applications for which the MPTCP functionality should be applied (i.e. the MPTCP traffic), as defined in bullet iv. The UE may route all other traffic (i.e. the non-MPTCP traffic) via the MA PDU Session, but this type of traffic shall be routed on one of 3GPP access or non-3GPP access, based on the received ATSSS rule for non-MPTCP traffic (see clause 5.32.2). The UPF shall route all other traffic (i.e. non-MPTCP traffic) based on the N4 rules provided by the SMF. This may include N4 rules for ATSSS-LL, using any steering mode as instructed by the N4 rules.

2. Low-Layer Steering Functionalities

The ATSSS-LL functionality in the UE does not apply a specific protocol. It is a data switching function, which decides how to steer, switch and split the uplink traffic across 3GPP and non-3GPP accesses, based on the provisioned ATSSS rules and local conditions (e.g. signal loss conditions). The ATSSS-LL functionality in the UE may be applied to steer, switch and split all types of traffic, including TCP traffic, UDP traffic, Ethernet traffic, etc.

The ATSSS-LL functionality may be enabled in the UE when the UE provides an "ATSSS-LL capability" during the PDU Session Establishment procedure.

The ATSSS-LL functionality is mandatory in the UE for MA PDU Session of type Ethernet. When the UE does not support the MPTCP functionality, the ATSSS-LL functionality is mandatory in the UE for an MA PDU Session of type IP. When the UE supports the MPTCP functionality, the ATSSS-LL functionality with Active-Standby Steering Mode is mandatory in the UE for an MA PDU Session of type IP to support non-MPTCP traffic.

The network shall also support the ATSSS-LL functionality as defined for the UE. The ATSSS-LL functionality in the UPF is enabled for a MA PDU Session by ATSSS-LL functionality indication received in the Multi-Access Rules (MAR).

<Additional Steering Modes>

To support these new steering modes, the link performance measurement function (PMF) defined in Rel-16 needs to be enhanced. The Rel-16 PMF can support the RTT measurement and access availability report per PDU session. Regarding the RTT measurement, a default QoS flow is used to transport the measurement traffic, and the RTT value detected on this QoS flow is treated as the RTT for this PDU session via this access. Obviously, it cannot reflect the accurate RTT for every traffic in this PDU session via this access. For some latency sensitive service traffic, the RTT measurement per QoS flow is needed. Furthermore, except the RTT, the loss ratio and jitter are also valuable to be measured for decision of the link performance, and consequently enable better traffic steering/switching/splitting. At the same time, some thresholds corresponding to these parameters, such as Maximum RTT, Maximum UL/DL Packet Loss Rate and jitter, can be sent to the UE and the UPF for triggering traffic steering/switching/splitting, similar as RAN support information defined for 3GPP access supporting the RAN for handover threshold decision.

The solution describes following different features:
RTT measurement per QoS flow;
Packet loss ratio measurement per QoS flow;
Jitter measurement per QoS flow;
Thresholds for traffic steering/switching/splitting;

These features may be independently selected for normative phase.

1. High-Level Description
1) Enhancement on Link Performance Measurement

The Rel-16 PMF is enhanced to support the RTT measurement per QoS flow, and to support measurement of the loss ratio and jitter per QoS flow, with both the UE and the UPF sending PMF messages per QoS flow. The enhancement of PMF is applied to the Rel-16 ATSSS-LL steering method and the QUIC-based steering method, to improve the traffic steering.

RTT Measurement Per QoS Flow:

Same as in Rel-16, when an MA PDU Session is established, the network may provide the UE with Measurement Assistance Information.

The RTT measurement per QoS flow may be triggered by UE or the UPF independently. The Measurement Assistance Information contains the QFI(s) for which the RTT measurement is to be applied. Optionally, the RTT measurement frequency can also be decided by the network side and sent to UE if available via Measurement Assistance Information.

The following mechanism is used.

In the case of the MA PDU session of IP type:
- The PMF in the UE sends PMF messages via one QoS flow to the PMF in the UPF over UDP/IP. The destination IP address and UDP port are as defined in Rel-16, i.e. the destination IP address is the PMF IP address, and the UDP port number corresponds to the access via which this message is sent. When the message is received by the UPF, the UPF can identify the PMF message based on the destination IP address.
- The PMF in the UPF sends PMF messages to the PMF in the UE over UDP/IP. The source IP address is the same IP address as the one provided in the Measurement Assistance Information and the source UDP port is one of the two UDP ports as provided in the Measurement Assistance Information as defined in R16. The destination IP address is the MA PDU session IP address allocated by the UE, and the UDP port is also sent by the UE via user plane after the MA PDU session establishment as defined in R16. When the message is received by the UE, the UE can identify the PMF message based on the source IP address of the PMF.

In the case of the MA PDU session of Ethernet type:
- The PMF in the UE sends PMF messages to the PMF in the UPF over Ethernet. The destination MAC address is included in the Measurement Assistance Information as defined in R16. Then the UPF can identify the PMF message based on the destination MAC address.
- The PMF in the UPF sends PMF messages to the PMF in the UE over Ethernet. The source MAC address and destination MAC address are as defined in R16. Then the UE can identify the PMF message based on the source MAC address.

The UE and the UPF derive an estimation of the average RTT over an access type by averaging the RTT measurements obtained over this access.

Packet Loss Ratio Measurement Per QoS Flow:

UE and UPF exchange the packet counting information in certain period to calculate the packet loss ratio during the path performance measurement procedure.
- The UE counts the number of UL packets via one QoS flow between one PMF request message and the previous PMF echo request message, and provides the result to the UPF via this PMF request message.
- UPF also counts the number of received UL packets between one PMF request message and the previous PMF request message via one QoS flow. UPF calculates the UL packet loss ratio based on the local counting result and the number of UL packets send by UE.
- UPF sends the UL packet loss ratio result to the UE via PMF response message. In the same message, it can also include the counting number of DL packets between one PMF response message and the previous PMF response message if the DL packets loss ratio is measured.
- UE counts the number of received DL between one PMF response message and the previous PMF response message. The UE calculates the DL packet loss ratio based on the local counting result and the number of DL packets send by UPF, and sends the DL packet loss ratio to the UPF via the subsequent PMF message.

2) Thresholds for Traffic Steering/Switching/Splitting

Some thresholds, such as Maximum RTT, Maximum UL/DL Packet Loss Rate and/or jitter, are provided to the UE and the UPF for triggering traffic steering/switching/splitting. These thresholds are to be applied to non-GBR QoS flow For the GBR QoS flow, only the jitter threshold parameter may be considered for the traffic steering/switching.

The PCF can provide the Maximum RTT, UL/DL Maximum Packet Loss Rate and jitter threshold parameters to the SMF, and SMF will forward these parameters to the UE and UPF via ATSSS rule or MAR rule. The threshold can be provided per QoS flow, working together with the link performance measurement per QoS flow. It can be applied to both the MPTCP functionality and ATSSS-LL functionality if the PMF is enhanced to support the RTT, loss rate and jitter measurement per QoS flow.

- The Maximum RTT indicates parameter for the decision of access availability via 3GPP access and non-3GPP access, i.e. the maximum RTT threshold that can be tolerated in the round trip for the QoS flow.
- The UL Maximum Packet Loss Rate indicates parameters for the decision of UL access availability via 3GPP access and non-3GPP access, i.e. the maximum rate for lost packets that can be tolerated in the uplink direction for the QoS flow.
- The DL Maximum Packet Loss Rate indicates parameters for the decision of DL access availability via 3GPP access and non-3GPP access, i.e. the maximum rate for lost packets that can be tolerated in the downlink direction for the QoS flow.
- The UL Maximum jitter indicates parameters for the decision of UL access availability via 3GPP access and non-3GPP access, i.e. the maximum jitter that can be tolerated in the uplink direction for the QoS flow.
- The DL Maximum jitter indicates parameters for the decision of DL access availability via 3GPP access and non-3GPP access, i.e. the maximum jitter that can be tolerated in the uplink direction for the QoS flow.

The Maximum RTT, UL Maximum Packet Loss Rate or DL Maximum Packet Loss Rate parameters for 3GPP and non-3GPP access can be provided separately. If the parameters for non-3GPP access are not included in the PCC rule, the corresponding values for 3GPP access apply.

Taking the redundancy steering mode as an example by using the above thresholds, if one access packet loss rate does not reach the UL/DL Maximum Packet Loss Rate, then only one access is applied to transport the traffic. But when one access packet loss rate is equal to or higher than the UL/DL Maximum Packet Loss Rate, then the redundancy transmission mode is triggered, till one access performance is improved.

NOTE: These thresholds can also be applied to existing steering modes, such as Priority-based steering mode, Active-Standby steering mode.

<Reflective QoS>

The UE needs to inform the UE of the QoS rule so that the UE can know the QoS information. In general, QoS rules are passed through signaling. To reduce signaling, reflective Qos has emerged. When sending a data packet to the terminal, it is sent by stamping RQI (Reflective QoS Indication) in the data packet header. The terminal receives it and creates a QoS rule by itself based on the packet. The QoS rule is referred to as a driven QoS rule. This is called reflective QoS.

In case of using reflective QoS, the base station performs Service Data Adaptation Protocol (SDAP) configuration. In this case, the terminal can know in which QoS flow data and PMF are transmitted.

Problems to be Solved in the Disclosure of this Specification

Conventionally, a method of performing access measurement for multiple QoS flows using PMF has been proposed. To this end, when the UE and the UPF exchange PMF messages, the UE and the UPF must send and receive measurement messages to the target QoS flow to be measured. In the case of UPF, there is QFI information in the GTP (GPRS Tunneling Protocol) header, so that when a packet is received, it can be known through which QoS flow the message was received. Therefore, when UPF sends a response to a PMF message, it is sufficient to transmit a PMF response message to the same QoS flow based on QFI (QoS Flow Identifier) information in the GTP header. However, in the case of the terminal, the QoS flow information for the received packet may not be recognized. If SDAP (Service Data Adaptation Protocol) configuration is made, the terminal can know QoS flow information for the received packet. However, SDAP settings are not required. In general, when using reflective QoS, SDAP setting is performed. If reflective QoS is not used, SDAP configuration is not performed, so the UE does not know QoS flow information for the received packet. In this case, there is a problem to perform measurement of QoS flow.

Disclosure of the Present Specification

The disclosures described below in this specification may be implemented in one or more combinations (e.g., a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementarily.

In Rel-16 ATSSS, the UE and UPF performs measurements over a default QoS Flow. So PMF messages are always sent over a default QoS Flow.

In Rel-17 ATSSS, the UE and UPF may perform measurements over target QoS Flow. It means that PMF messages shall be sent over target QoS Flow. In order to support it, the UE and UPF shall be able to know target QoS Flow for the PMF message when they response to the received PMF message.

If access performance measurement is required for a QoS Flow, the QoS Flow may be a bidirectional QoS Flow.

For uplink measurements, when the UPF receives data packet or PMF message, the UPF may know the target QoS Flow because the GTP header indicates QFI. But for downlink, when the UE receives data packet or PMF message, the UE may not know target QoS Flow unless SDAP header is used for the corresponding radio bearer. The UE may not know whether multiple QoS Flows are mapped to single radio bearer or not in the downlink. So even though RAN performs 1:1 mapping, the UE may not know received QoS Flow information if there is no SDAP header.

The UE may not determine over which QoS Flow the data packet or PMF message is received if SDAP header is not configured over the associated radio bearer.

The QoS Flow that the PMF message is received may be identified by using multiple PMF addresses or by indicating QFI in the PMF message. But there is no way for a UE to know QoS Flow of data packets.

There can be three solutions:
Option a) Indicate QFI in the PMF message
Option b) Mandate usage of SDAP header by sending RQA to the NG-RAN
Option c) Providing DL QoS Flow information to the UE as a part of QoS rule As another method, similar to option c, while transmitting DL QoS Flow information, it may be transmitted through a separate IE instead of being included in the QoS rule. Through this, it is possible to prevent the UE from unnecessarily checking the DL QOS rule before transmitting the packet. Including the DL QoS Flow information in the QoS rule may mean including the DL filter information in the QoS rule.

Indicating QFI in the PMF message (Option a) works for RTT measurements but may not work for PLR measurement. RTT measurements may be done solely based on PMF message itself. However, for PLR measurements, the UE may need to count number of received packets for the target QoS Flow. So just indicating QFI in the PMF message may not solves issue because the UE needs to know over which QoS Flow the UE received data traffic.

Indicating QFI in the PMF message (option a) may not be used for PLR measurement because the UE needs to count received data packets.

Both option b and option c may not require any new mechanism in the current specification because they use existing mechanism. However, both options have drawbacks. For option b), there may impact to the radio performance as there is additional overhead to send SDAP header. For option c), the SMF may not be able to use this option because there is limitation to the number of packet filters the UE can support. UE may send maximum number of packet filters, the UE can support during the PDU Session Establishment, to avoid providing more packet filters than the UE supports. Also the UE may need to check QoS rule when it received downlink traffic, which is not supported for now.

Mandating SDAP header configuration may impact the radio performance and providing downlink QoS information may not be possible considering UE capability.

it seems better to have both options. The SMF can determine which one to use considering various factors e.g., whether reflective QoS needs to be used, number of QoS Flows, maximum number of packet filter the UE can support, operator configuration, etc. This means that the SMF does not need to provide downlink QoS Flow information to the UE if the SMF knows that the QoS Flow can be determined by the UE. For example, if the SMF needs to use reflective QoS for a QoS Flow, the SMF may not need to provide the downlink QoS Flow information to the UE.

In addition, configuration information on whether SDAP is used in NG-RAN may be considered.

Based on above observations, it may be proposed as described below according to the disclosure of the present specification.

- the SMF or PCF may ensure that a QoS Flow shall be bidirectional QoS Flow if measurements are required for the QoS Flow
- the SMF may ensure that the UE can determine over which QoS Flow the UE received user plane packet either by providing RQA to the NG-RAN or by providing downlink QoS Flow information in the QoS rule When the SMF indicates that the UE shall perform access performance measurements based on the target QoS Flow, the SMF may ensure that the UE can determine over which QoS Flow the user plane traffic is received either by sending downlink QoS Flow information in the QoS rule or by sending RQA to the NG-RAN so that NG-RAN indicates QFI in the downlink.

In order to determine which method to use, the SMF can take into account various factors e.g. such as whether reflective QoS needs to be used, number of QoS Flows, maximum number of packet filter the UE can support, operator configuration, etc. For example, if a QoS Flow requires to activate Reflective QoS, the SMF does not provide downlink QoS Flow information for the QoS Flow to minimize usage of packet filters. When a data packet is received over a QoS Flow, the UE can decide whether to check downlink QoS Flow information based on existence of SDAP header for the QoS Flow.

A QoS Flow may be a bidirectional QoS Flow if access performance measurements are required for the QoS Flow.

For example, the SMF may not include downlink QoS flow information in the QoS rule for QoS flows for which reflective QoS should be used. Alternatively, if the SMF knows that SDAP is always used in NG-RAN by the operator configuration, it may not include downlink QoS Flow information in the QoS rule. In addition, the downlink QoS Flow information can be transmitted using a separate IE without being included in the QoS rule.

In addition, reflective QoS may always be performed for QoS flows that require PLR measurement in SMF/PCF based on operator policy/configuration.

On the other hand, whether to use the SDAP header may be different for each QoS flow in the NG-RAN. Therefore, when the UE receives data, if the SDAP header is used for the received radio bearer, it can determine which QoS flow is used based on the QFI in the SDAP header. And, only when data is received through a radio bearer without an SDAP header, the UE searches downlink QoS flow information to determine through which QoS flow data was received. Through this, the overhead of checking the downlink QoS flow for all data packets can be reduced.

In addition, the SMF may perform the above operation only for QoS flows that require PLR measurement for a QoS flow other than the default QoS flow. Therefore, the UE may also perform the above operation only for QoS Flows that require PLR measurement, not the default QoS Flow. This may be determined by the UE through the ATSSS rule and QoS rule, or may be determined through information on per QoS Flow measurement from the SMF and the ATSSS rule.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 12:
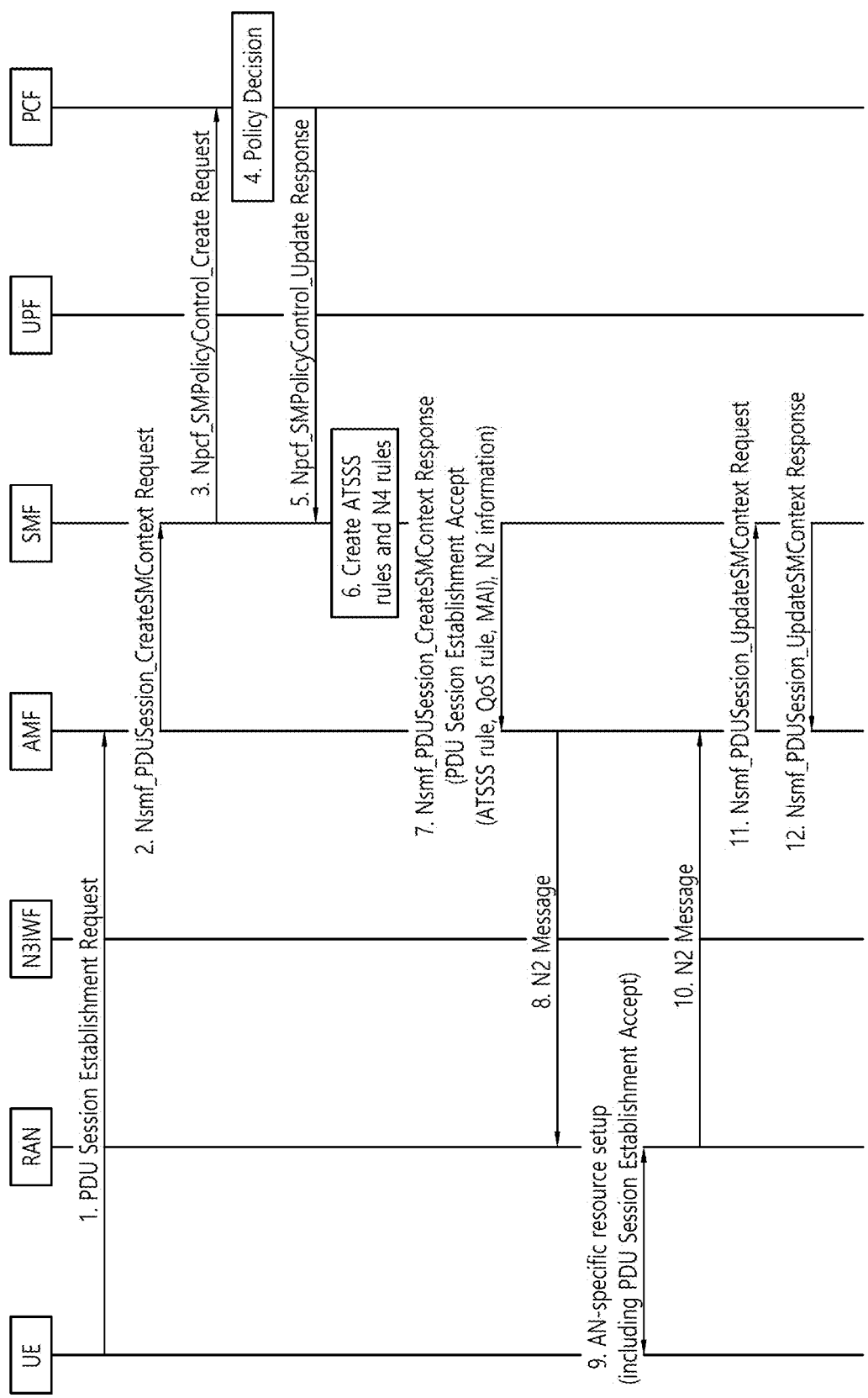
FIGS. 12 and 13 are flowcharts illustrating the disclosure of the present specification.
Figure 13:
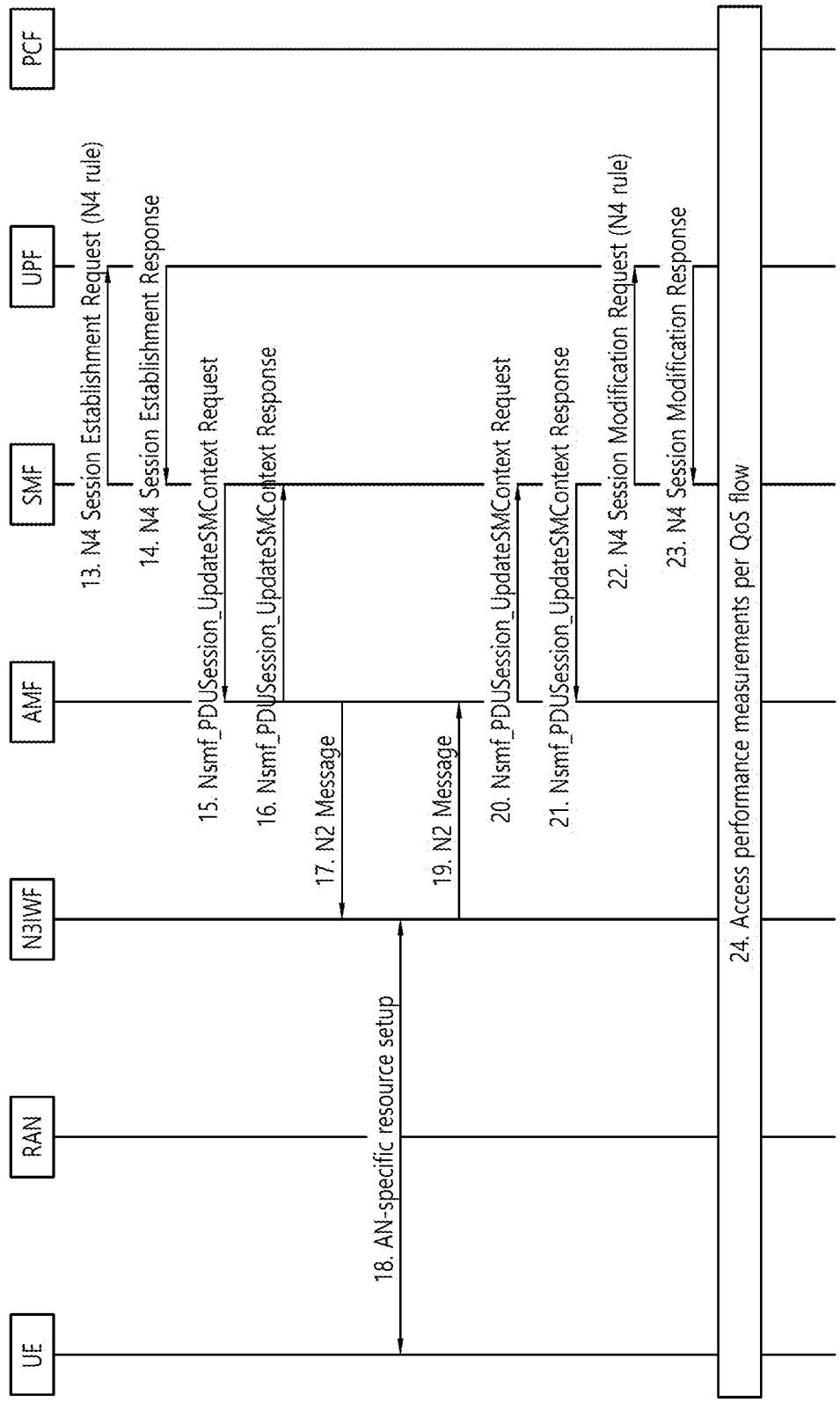

FIGS. 12 and 13 are flowcharts illustrating the disclosure of the present specification.

FIGS. 12 and 13 show a method for allowing the UE to know through which QoS flow the data received by the UE is transmitted in the process of creating the MA PDU session. A procedure to be described below shows a process in which the UE successfully registers with the same PLMN through 3GPP access and non-3GPP access, and then creates an MA PDU session through 3GPP access.

1. The UE may transmit a PDU Session Establishment request message to create a Multi-Access (MA) protocol data unit (PDU) session. In this case, in order to inform that it is a request for creating an MA PDU session, an MA PDU request indication may be transmitted together. In addition, ATSSS (Access Traffic Steering, Switching and Splitting) capability information may be transmitted together. In this case, capability information on whether the UE can perform access performance measurement for each QoS (Quality of Service) flow may be transmitted together.

2. The AMF may deliver the PDU Session Establishment request message transmitted by the UE to the SMF. In this case, the AMF may inform the SMF that the UE is registered in both 3GPP (3rd Generation Partnership Project) access and non-3GPP access.

3-5. The SMF may perform procedure for creating SM policy association with the PCF. In this procedure, the SMF may transmit ATSSS capability information of the UE to the PCF. The PCF may determine a policy. The PCF may transmit a PCC rule (Policy and charging control rule) for the MA PDU session to the SMF.

6. The SMF may decide to perform access performance measurement per QoS flow, based on the PCC rule (Policy and charging control rule) and the capability information sent by the UE. At this time, the SMF includes downlink QoS filter information in QoS rule when creating the QoS rule so that the UE can know over which QoS flow a packet is transmitted when the UE receives the data packet and/or PMF (Performance Measurement Function) message. If reflective QoS is used for a specific QoS flow according to the PCC rule, a downlink QoS filter may not be included in the QoS rule for the specific QoS flow. In case of using reflective QoS, the base station performs Service Data Adaptation Protocol (SDAP) configuration and based on QoS flow information in the SDAP header, the UE can know over which QoS flow data and PMF are transmitted.

In addition, in order to allow the UE to perform access performance measurement per QoS flow, a QoS flow list for performing measurement may be created and this may be included in MAI (Measurement Assistance Information). ATSSS rules for traffic steering may be also created.

7-8. The SMF may transmit the created QoS rule, ATSSS rule, and MAI (Measurement Assistance Information) to the UE by putting it in a PDU Session Establishment Accept message. In this process, N2 information to be transmitted to the RAN (Radio Access Network) may also be transmitted. In this case, when reflective QoS is used, in order to inform that reflective QoS is used in QoS information of N2 information, RQA (Reflective QoS Attribute) may be included and transmitted.

9. The RAN may transmit the PDU Session Establishment Accept message transmitted by the SMF to the UE. In addition, it is possible to create a radio bearer according to the N2 information sent by the SMF. In this process, if SMF includes RQA for a QoS flow in the N2 information, configuration may be performed to use an SDAP header for a radio bearer mapped to the corresponding QoS flow.

10-12. The RAN may transmit a response to the N2 information sent by the SMF to the SMF.

13-14. The SMF may perform the N4 establishment process for UPF resource setup for the MA PDU session.

15-23. If the AMF informed that the UE is registered for both 3GPP access and non-3GPP access in step 2, the SMF performs a resource setup process for non-3GPP access.

24. After the MA PDU session is created, the UE and the UPF may perform access performance measurement per QoS flow. At this time, when the UE receives data or a PMF message, if the SDAP header is used for the received radio bearer, the UE can determine which QoS Flow is used for the received data or a PMF message based on the QFI in the SDAP header. If data is received through a radio bearer without an SDAP header, the UE may determine which QoS flow is used for the received data or a PMF message by using downlink packet filter information in the QoS rule.

Figure 14:
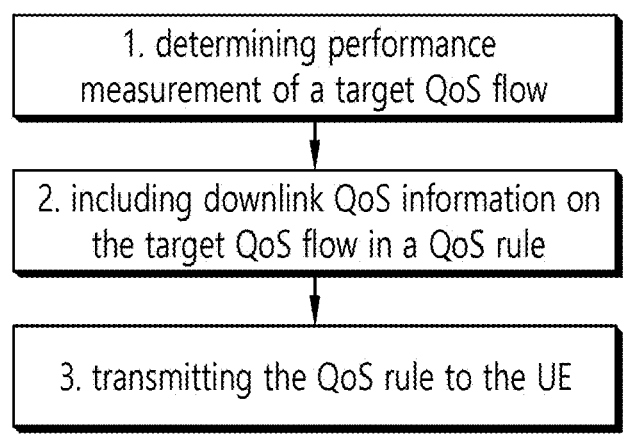
FIG. 14 is a flowchart illustrating a procedure performed by the SMF.

FIG. 14 is a flowchart illustrating a procedure performed by the SMF.

1. The SMF may determine performance measurement of a target QoS (Quality of Service) flow,
wherein downlink packet for the SDF is transmitted on the target QoS flow to a UE (user equipment);

2. The SMF may include downlink QoS information on the target QoS flow in a QoS rule, based on reflective QoS being not used for the SDF; and 3. The SMF may transmit the QoS rule to the UE.

The SMF may receive PDU (protocol data unit) session establishment request message from the UE, the step of transmitting the QoS rule may be transmitting PDU session establishment accept message including the QoS rule.

The PDU session establishment request message may include MA (multi-access) PDU session request indication.

Based on reflective QoS being used for the SDF, the SMF may skip the step of including downlink QoS information on the target QoS flow in QoS rule.

Figure 15:
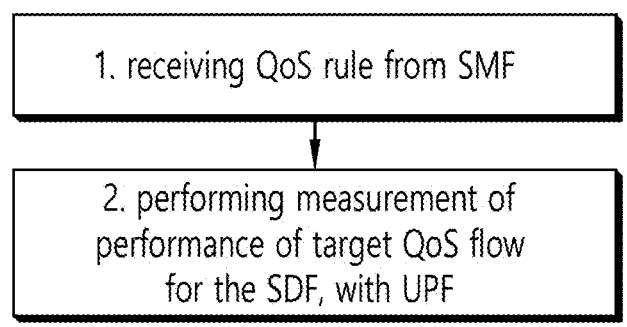
FIG. 15 is a flowchart illustrating a procedure performed by the UE.

FIG. 15 is a flowchart illustrating a procedure performed by the UE.

1. The UE may receive a QoS (Quality of Service) rule from SMF (Session Management Function);

2. The UE may perform measurement of performance of a target QoS flow for the SDF, with a UPF (User Plane Function), Based on a reflective QoS being not used for the SDF, the QoS rule may include downlink QoS information on the target QoS flow, The target QoS flow may be a QoS flow used by the UE to receive a downlink packet for the SDF.

The UE may transmit PDU (protocol data unit) session establishment request message to the SMF; the step of receiving the QoS rule may be receiving the PDU session establishment accept message including the QoS rule.

The PDU session establishment request message may include MA (multi-access) PDU session request indication.

Based on reflective QoS being used for the SDF, the QoS rule may not include downlink QoS information of the target QoS flow.

Hereinafter, an apparatus in measuring performance of SDF (service data flow), according to some embodiments of the present disclosure, will be described.

For example, an apparatus may include a processor, a transceiver, and a memory.

For example, the processor may be configured to be coupled operably with the memory and the processor.

The processor may be configured to receive QoS (Quality of Service) rule from SMF (Session Management Function); The processor may be configured to perform measurement of performance of target QoS flow for the SDF, with UPF (User Plane Function), wherein based on reflective QoS being not used for the SDF, the QoS rule includes information on the target QoS flow, wherein the target QoS flow is a QoS flow used by the apparatus to receive a downlink packet for the SDF.

Hereinafter, a non-transitory computer-readable medium has stored thereon a plurality of instructions for measuring performance of SDF (service data flow) in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a UE.

The stored a plurality of instructions may cause the UE to receive QoS (Quality of Service) rule from SMF (Session Management Function); and perform measurement of performance of target QoS flow for the SDF, with UPF (User Plane Function), wherein based on reflective QoS being not used for the SDF, the QoS rule includes information on the target QoS flow, wherein the target QoS flow is a QoS flow used by the apparatus to receive a downlink packet for the SDF.

The present disclosure may have various advantageous effects.

For example, by performing disclosure of this specification, UE is able to know which QoS flow the performance is being measured when measuring the performance of the QoS flow.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method for performance measurement of SDF (service data flow), performed by SMF (Session Management Function), comprising:
   determining performance measurement of a target QoS (Quality of Service) flow,
   wherein downlink packet for the SDF is transmitted on the target QoS flow to a UE (user equipment);
   including downlink QoS information on the target QoS flow in a QoS rule, based on a reflective QoS being not used for the SDF; and
   transmitting the QoS rule to the UE.

2. The method of claim 1, further comprising:
   receiving PDU (protocol data unit) session establishment request message from the UE;
   wherein the step of transmitting the QoS rule comprises transmitting PDU session establishment accept message including the QoS rule.

3. The method of claim 2,
   wherein the PDU session establishment request message includes MA (multi-access) PDU session request indication.

4. The method of claim 1,
   wherein based on the reflective QoS being used for the SDF, the method further comprises skipping the step of including downlink QoS information on the target QoS flow in QoS rule.

5. A method to measure performance of SDF (service data flow), performed by UE (user equipment), comprising:
   receiving a QoS (Quality of Service) rule from a SMF (Session Management Function);
   performing measurement of performance of a target QoS flow for the SDF, with a UPF (User Plane Function),
   wherein based on a reflective QoS being not used for the SDF, the QoS rule includes downlink QoS information on the target QoS flow,
   wherein the target QoS flow is a QoS flow used by the UE to receive a downlink packet for the SDF.

6. The method of claim 5, further comprising:
   transmitting a PDU (protocol data unit) session establishment request message to the SMF;
   wherein the step of receiving the QoS rule comprises receiving the PDU session establishment accept message including the QoS rule.

7. The method of claim 5,
   wherein the PDU session establishment request message includes a MA (multi-access) PDU session request indication.

8. The method of claim 5,
   wherein based on the reflective QoS being used for the SDF, the QoS rule does not include downlink QoS information of the target QoS flow.

9. A device configured to perform performance measurement of SDF (service data flow), the device comprising:
   a transceiver; and
   a processor,
   wherein the transceiver receives a QoS (Quality of Service) rule from a SMF (Session Management Function);
   wherein the processor performs measurement of performance of a target QoS flow for the SDF, with a UPF (User Plane Function),
   wherein based on a reflective QoS being not used for the SDF, the QoS rule includes downlink QoS information on the target QoS flow,
   wherein the target QoS flow is a QoS flow used by the device to receive a downlink packet for the SDF.

* * * * *